US011201661B2

(12) United States Patent
Venugopal et al.

(10) Patent No.: US 11,201,661 B2
(45) Date of Patent: Dec. 14, 2021

(54) BEAM FAILURE RECOVERY WITH SUPPLEMENTARY UPLINK

(71) Applicant: QUALCOMM Incorporated, San Diego, CA (US)

(72) Inventors: Kiran Venugopal, Raritan, NJ (US); Makesh Pravin John Wilson, San Diego, CA (US); Jung Ho Ryu, Fort Lee, NJ (US); Tianyang Bai, Bridgewater, NJ (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 16/660,328

(22) Filed: Oct. 22, 2019

(65) Prior Publication Data
US 2020/0136715 A1   Apr. 30, 2020

Related U.S. Application Data

(60) Provisional application No. 62/750,230, filed on Oct. 24, 2018.

(51) Int. Cl.
*H04B 7/08* (2006.01)
*H04W 76/11* (2018.01)
(Continued)

(52) U.S. Cl.
CPC ........ *H04B 7/088* (2013.01); *H04W 72/0453* (2013.01); *H04W 74/0833* (2013.01); *H04W 76/11* (2018.02)

(58) Field of Classification Search
CPC .... H04B 7/0617; H04B 7/0695; H04B 7/088; H04W 16/28; H04W 36/305;
(Continued)

(56) References Cited

U.S. PATENT DOCUMENTS 10,887,939 B2 *  1/2021  Zhou ................... H04B 17/103
2018/0278467 A1  9/2018  John Wilson et al.
(Continued)

OTHER PUBLICATIONS

Huawei et al., "Discussion on BFR for SCell", 3GPP Draft; R1-1809120, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018 Aug. 11, 2018, XP051516489, Retrieved from the Internet: URL:http://www.3gpp.org/ftp/tsg%5Fran/WG1%5FRL1/TSGR1%5F94/Docs/R1%2D1809120%2Ezip [retrieved on Aug. 11, 2018], 6 pages.
(Continued)

*Primary Examiner* — Minh Trang T Nguyen
(74) *Attorney, Agent, or Firm* — Muncy, Geissler, Olds & Lowe, P.C./Qualcomm

(57) ABSTRACT

Disclosed are techniques for beam failure recovery in a wireless communications system. In an aspect, a user equipment (UE) detects a beam failure of a first downlink beam received at the UE from a base station, wherein the first downlink beam is a primary downlink beam for a first cell supported by the base station, sends, to the base station, on a supplementary uplink (SUL) beam, a message including an indication of the beam failure and an identification of a second downlink beam to replace the first downlink beam as the primary downlink beam for the first cell, and, based on the base station configuring the second downlink beam as the primary downlink beam for the first cell, establishes an uplink beam for the first cell based on properties of the second downlink beam.

62 Claims, 16 Drawing Sheets

(51) Int. Cl.
*H04W 74/08* (2009.01)
*H04W 72/04* (2009.01)

(58) Field of Classification Search
CPC ......... H04W 72/0453; H04W 74/0833; H04W 76/11; H04W 76/19
See application file for complete search history.

(56) References Cited

U.S. PATENT DOCUMENTS

2019/0037498 A1* 1/2019 Tseng ............... H04W 52/0219
2019/0053294 A1 2/2019 Xia et al.
2019/0097874 A1* 3/2019 Zhou .................... H04L 5/0023

OTHER PUBLICATIONS

International Search Report and Written Opinion—PCT/US2019/057665—ISA/EPO—Jan. 22, 2020.
Lenovo et al., "Discussion of Beam Failure Recovery for Carrier Aggregation", 3GPP Draft; R1-1804211_BFR, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018 Apr. 6, 2018, XP051413160, Retrieved from the Internet: URL:http://www.3gpp.org/ftp/tsg%5Fran/WG1%5FRL1/TSGR1%5F92b/Docs/ [retrieved on Apr. 6, 2018], 3 pages.
Samsung: "Corrections on Beam Failure Recovery", 3GPP Draft; R1-1804359, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018 Apr. 6, 2018, XP051413245, Retrieved from the Internet: URL:http://www.3gpp.org/ftp/tsg%5Fran/WG1%5FRL1/TSGR1%5F92b/Docs/ [retrieved on Apr. 6, 2018], 5 pages.
Sharp: "Remaining Issues on Beam Failure Recovery", 3GPP Draft; R2-1800560, 3rd Generation Partnership Project (3GPP), Mobile Competence Centre; 650, Route Des Lucioles; F-06921 Sophia-Antipolis Cedex; France, vol. RAN WG2, No. Vancouver, Canada; Jan. 22, 2018-Jan. 26, 2018 Jan. 12, 2018, XP051386222, Retrieved from the Internet: URL:http://www.3gpp.org/ftp/tsg%5Fran/WG2%5FRL2/TSGR2%5FAHs/2018%5F01%5FNR/Docs/[retrieved on Jan. 12, 2018], 13 pages.

* cited by examiner

BEAM FAILURE RECOVERY WITH SUPPLEMENTARY UPLINK

CROSS-REFERENCE TO RELATED APPLICATIONS

The present Application for Patent claims the benefit of U.S. Provisional Application No. 62/750,230, entitled "BEAM FAILURE RECOVERY WITH SUPPLEMENTARY UPLINK," filed Oct. 24, 2018, assigned to the assignee hereof, and expressly incorporated herein by reference in its entirety.

BACKGROUND

Technical Field

The present disclosure relates generally to wireless communications systems, and more particularly to beam failure recovery with supplementary uplink in a wireless communications system that supports primary cell (PCell) and supplementary uplink operations.

Background

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is a fifth generation (5G) telecommunications standard referred to as "New Radio" (NR). NR is part of a continuous mobile broadband evolution promulgated by the Third Generation Partnership Project (3GPP) to meet new requirements associated with latency, reliability, security, scalability (e.g., with the Internet of Things (IoT)), and other requirements. Some aspects of 5G NR may be based on the fourth generation (4G) telecommunications standard referred to as "Long Term Evolution" (LTE). There exists a need for further improvements in NR technology. These improvements may also be applicable to other multi-access technologies and the telecommunication standards that employ these technologies.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of beam failure recovery in a wireless communications system performed by a user equipment (UE) includes detecting a beam failure of a first downlink beam received at the UE from a base station, wherein the first downlink beam is a primary downlink beam for a first cell supported by the base station, sending, to the base station, on a supplementary uplink (SUL) beam, a message including an indication of the beam failure and an identification of a second downlink beam to replace the first downlink beam as the primary downlink beam for the first cell, and establishing, based on the base station configuring the second downlink beam as the primary downlink beam for the first cell, an uplink beam for the first cell based on properties of the second downlink beam.

In an aspect, a method of beam failure recovery in a wireless communications system performed by a UE includes detecting a SUL beam failure of a first SUL beam, sending, to a base station, on a first uplink beam for a first cell supported by the base station, a message including an indication of the SUL beam failure, receiving, from the base station, a response to the message, and establishing, based on the response from the base station, a second SUL beam to replace the first SUL beam, wherein the UE uses properties of the response to configure properties of the second SUL beam.

In an aspect, an apparatus for beam failure recovery in a wireless communications system includes at least one processor of a UE configured to: detect a beam failure of a first downlink beam received at the UE from a base station, where the first downlink beam is a primary downlink beam for a first cell supported by the base station, cause a transceiver of the UE to send, to the base station, on an SUL beam, a message including an indication of the beam failure and an identification of a second downlink beam to replace the first downlink beam as the primary downlink beam for the first cell, and establish, based on the base station configuring the second downlink beam as the primary downlink beam for the first cell, an uplink beam for the first cell based on properties of the second downlink beam.

In an aspect, an apparatus for beam failure recovery in a wireless communications system includes at least one processor of a UE configured to: detect an SUL beam failure of a first SUL beam, cause a transceiver of the UE to send, to a base station, on a first uplink beam for a first cell supported by the base station, a message including an indication of the SUL beam failure, cause the transceiver to receive, from the base station, a response to the message, and establish, based on the response from the base station, a second SUL beam to replace the first SUL beam, wherein the at least one processor is configured to uses properties of the response to configure properties of the second SUL beam.

In an aspect, an apparatus for beam failure recovery in a wireless communications system includes means for detecting a beam failure of a first downlink beam received at a UE from a base station, where the first downlink beam is a primary downlink beam for a first cell supported by the base station, means for sending, to the base station, on an SUL beam, a message including an indication of the beam failure and an identification of a second downlink beam to replace the first downlink beam as the primary downlink beam for the first cell, and means for establishing, based on the base station configuring the second downlink beam as the primary downlink beam for the first cell, an uplink beam for the first cell based on properties of the second downlink beam.

In an aspect, an apparatus for beam failure recovery in a wireless communications system includes means for detecting an SUL beam failure of a first SUL beam based on a signal strength of reference signals received on a first downlink beam for a first cell supported by a base station, means for sending, to the base station, on a first uplink beam for the first cell supported by the base station, a message including an indication of the SUL beam failure, means for receiving, from the base station, a response to the message, and means for establishing, based on the response from the base station, a second SUL beam to replace the first SUL beam, wherein properties of the response are used to configure properties of the second SUL beam.

In an aspect, a non-transitory computer-readable medium storing computer-executable instructions includes computer-executable instructions comprising: at least one instruction instructing a UE to detect a beam failure of a first downlink beam received at the UE from a base station, where the first downlink beam is a primary downlink beam for a first cell supported by the base station, at least one instruction instructing the UE to send, to the base station, on an SUL beam, a message including an indication of the beam failure and an identification of a second downlink beam to replace the first downlink beam as the primary downlink beam for the first cell, and at least one instruction instructing the UE to establish, based on the base station configuring the second downlink beam as the primary downlink beam for the first cell, an uplink beam for the first cell based on properties of the second downlink beam.

In an aspect, a non-transitory computer-readable medium storing computer-executable instructions includes computer-executable instructions comprising: at least one instruction instructing a UE to detect a SUL beam failure of a first SUL beam, at least one instruction instructing the UE to send, to a base station, on a first uplink beam for a first cell supported by the base station, a message including an indication of the SUL beam failure, at least one instruction instructing the UE to receive, from the base station, a response to the message, and at least one instruction instructing the UE to establish, based on the response from the base station, a second SUL beam to replace the first SUL beam, wherein the UE is configured to use properties of the response to configure properties of the second SUL beam.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
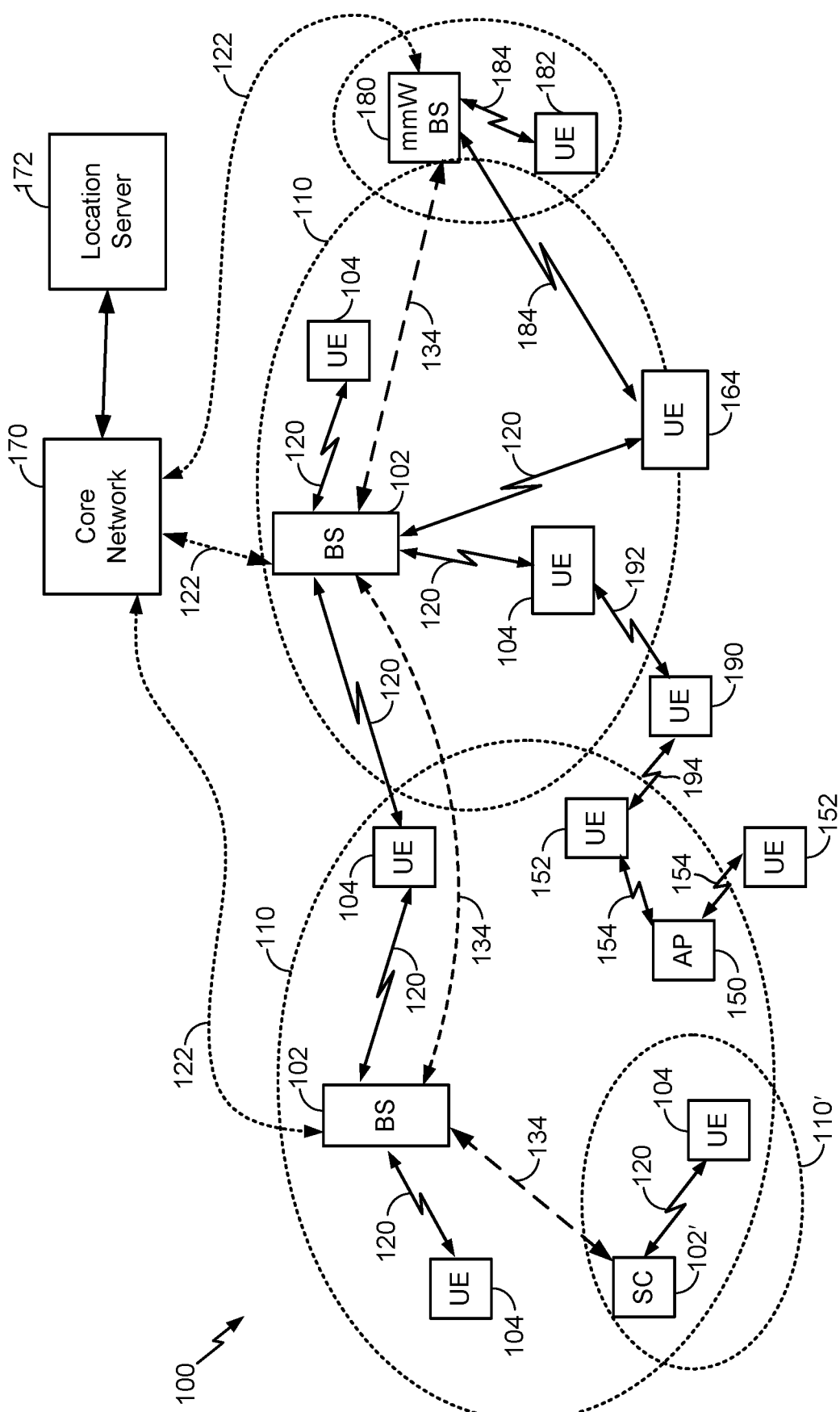
FIG. 1 is a diagram illustrating an example of a wireless communications system and an access network, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the 802.11 standard from the Institute of Electrical and Electronics Engineers (IEEE), etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink (UL)/reverse or downlink (DL)/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. For simplicity, an RF signal may also be referred to as simply a "signal."

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to the downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
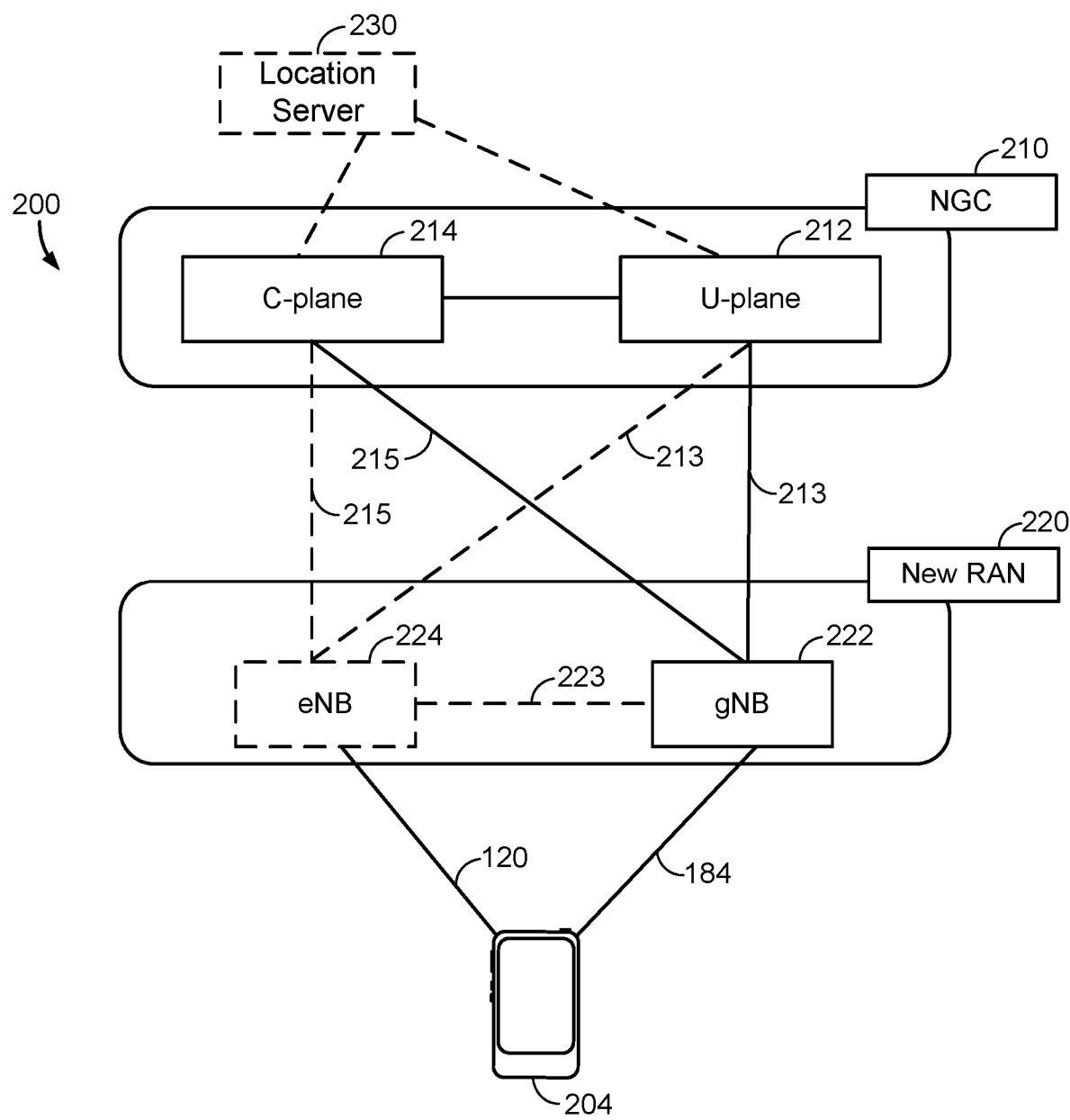
FIGS. 2A and 2B illustrate example wireless network structures, according to various aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
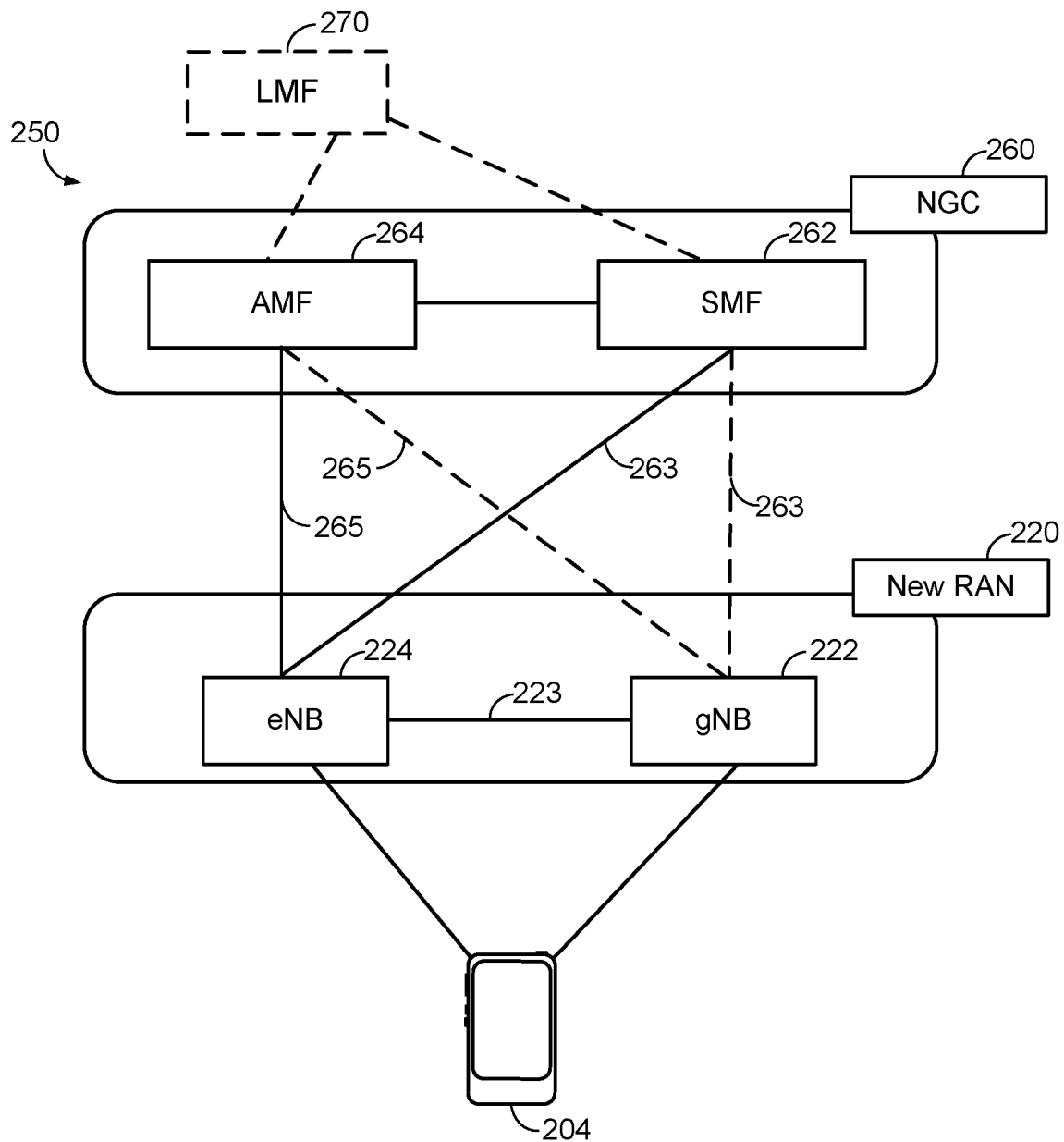

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
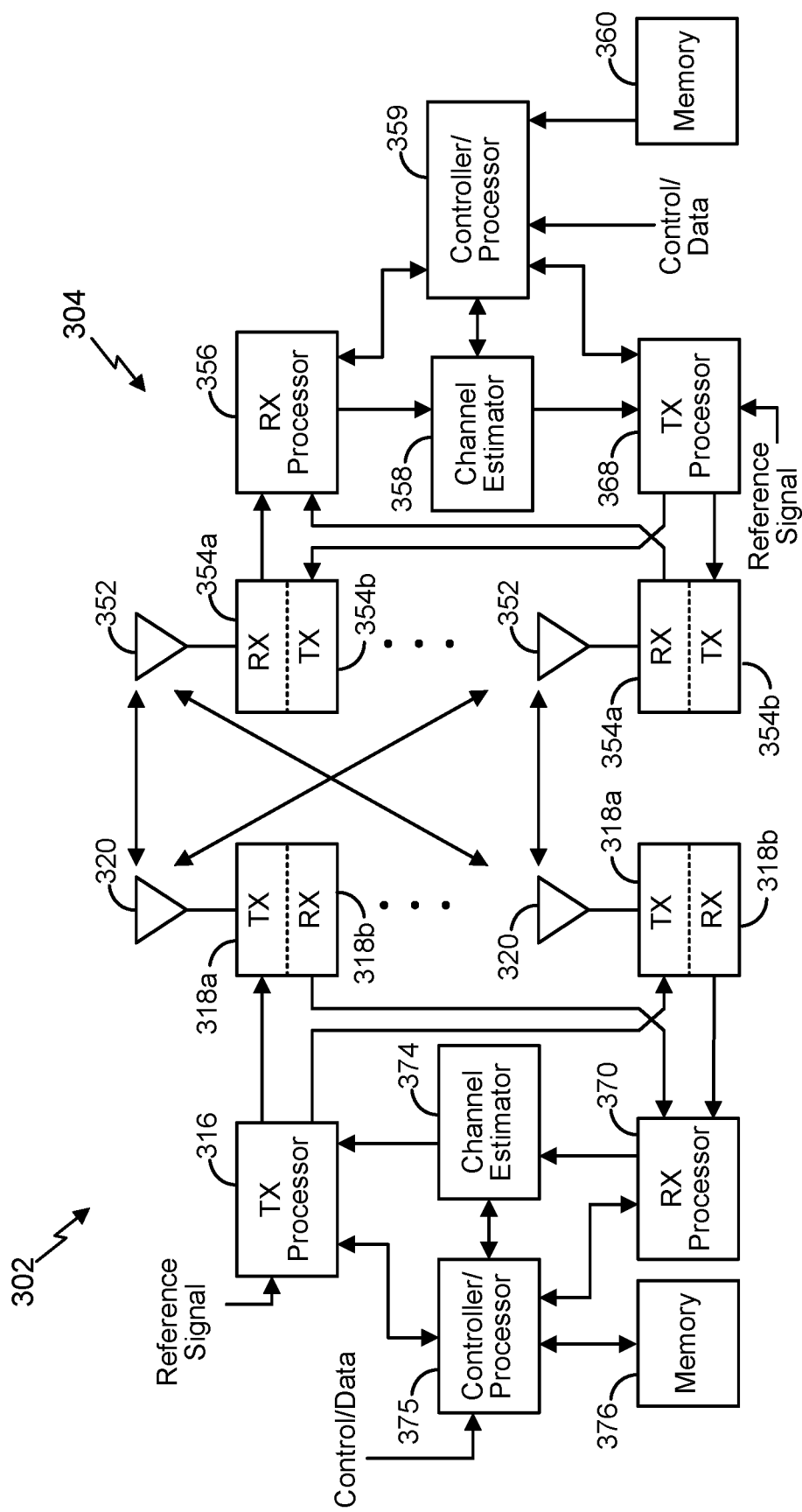
FIG. 3 is a diagram illustrating an example of a base station and a UE in an access network, according to aspects of the disclosure.

FIG. 3 illustrates an exemplary base station 302 (e.g., an eNB, a gNB, a small cell AP, a WLAN AP, etc.) in communication with an exemplary UE 304 in a wireless network, according to aspects of the disclosure. The base station 302 may correspond to any of base stations 102, 150, and 180 in FIG. 1 or gNB 222 or eNB 224 in FIGS. 2A and 2B, and the UE 304 may correspond to any of UEs 104, 152, 182, 190 in FIG. 1 or UE 204 in FIGS. 2A and 2B. In the downlink, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 304. Each spatial stream may then be provided to one or more different antennas 320 via a separate transmitter 318a. Each transmitter 318a may modulate an RF carrier with a respective spatial stream for transmission.

At the UE 304, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 304. If multiple spatial streams are destined for the UE 304, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 302. These soft decisions may be based on channel estimates computed by the channel estimator 358. The soft decisions are then decoded and de-interleaved to recover the data and control signals that were originally transmitted by the base station 302 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the downlink transmission by the base station 302, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator 358 from a reference signal or feedback transmitted by the base station 302 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission. In an aspect, the transmitters 354b and the receivers 354a may be one or more transceivers, one or more discrete transmitters, one or more discrete receivers, or any combination thereof.

The uplink transmission is processed at the base station 302 in a manner similar to that described in connection with the receiver function at the UE 304. Each receiver 318b receives a signal through its respective antenna 320. Each receiver 318b recovers information modulated onto an RF carrier and provides the information to a RX processor 370. In an aspect, the transmitters 318a and the receivers 318b may be one or more transceivers, one or more discrete transmitters, one or more discrete receivers, or any combination thereof.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 304. IP packets from the controller/processor 375 may be provided to the core network. The controller/processor 375 is also responsible for error detection.

Figure 4A:
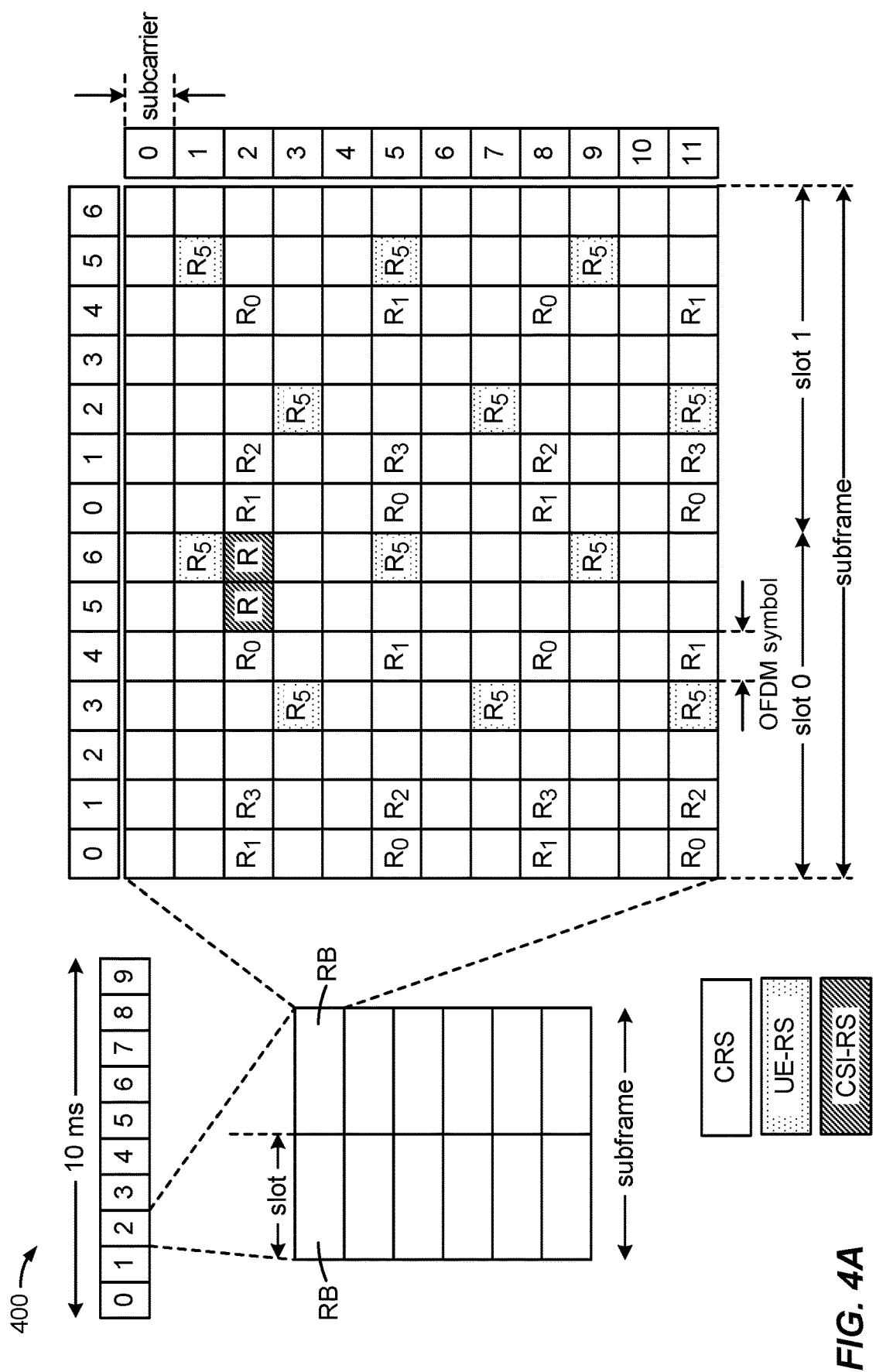
FIGS. 4A to 4D are diagrams illustrating examples of frame structures and channels within the frame structures, according to aspects of the disclosure.
Figure 4B:
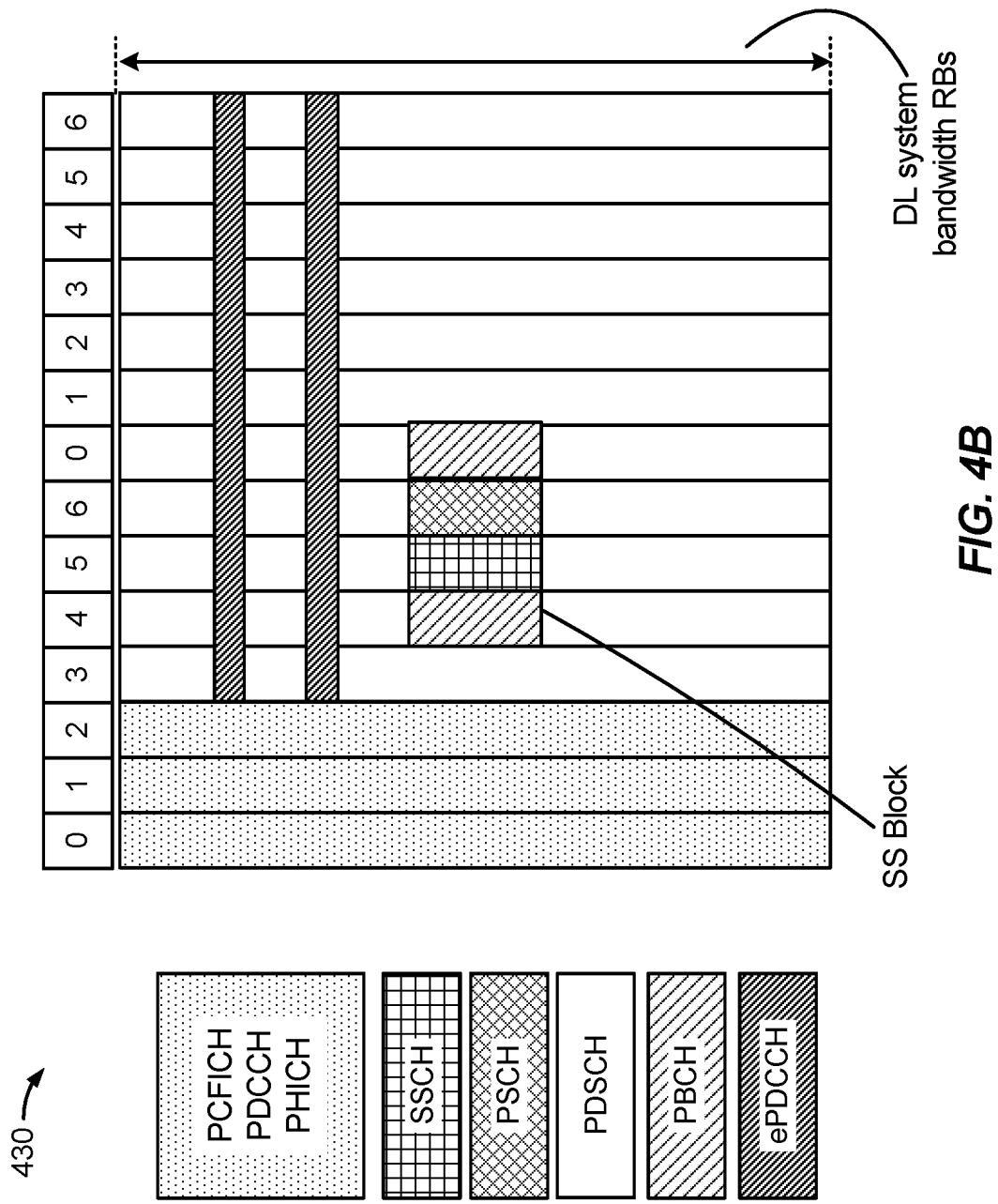
Figure 4C:
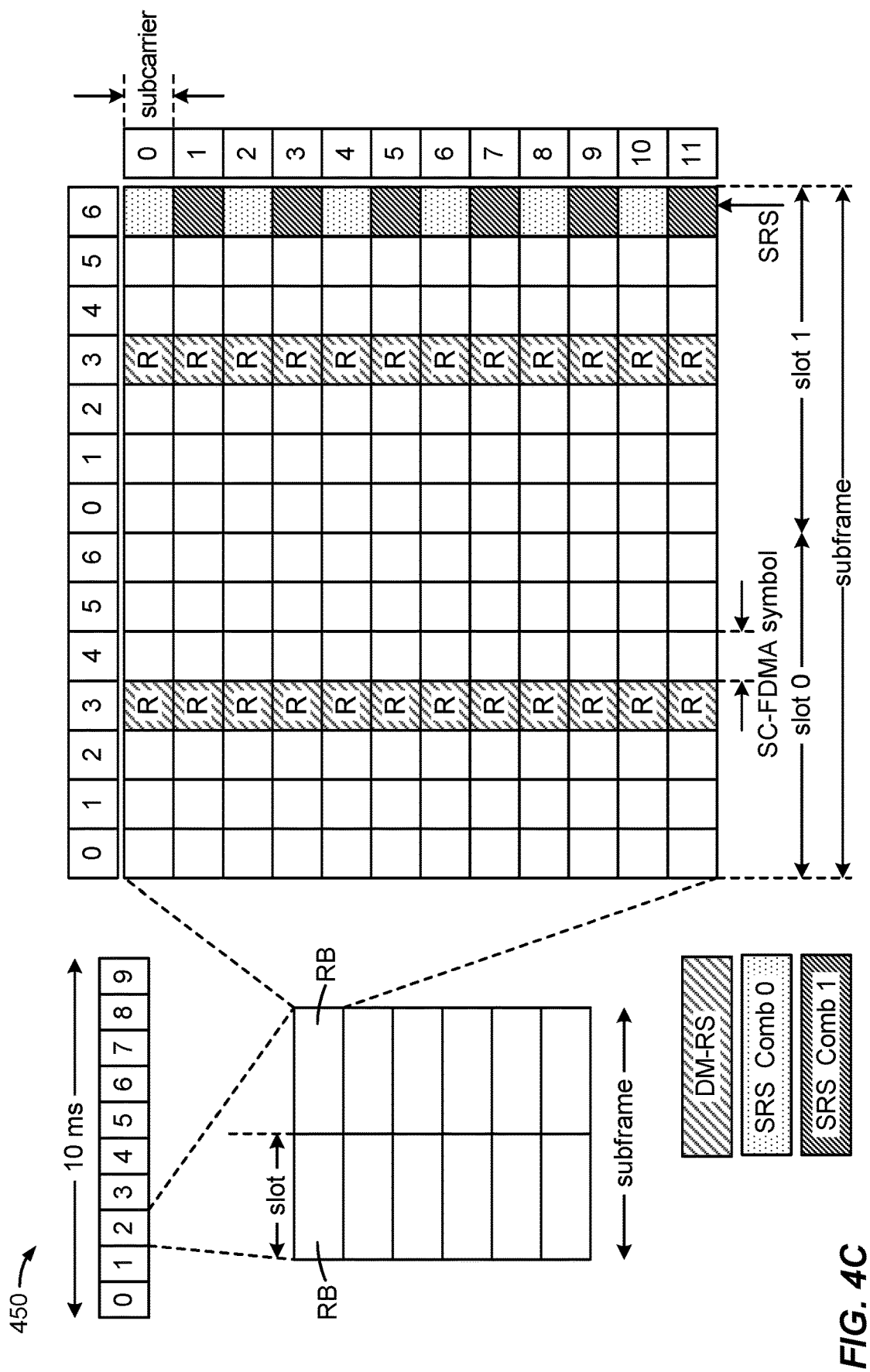
Figure 4D:
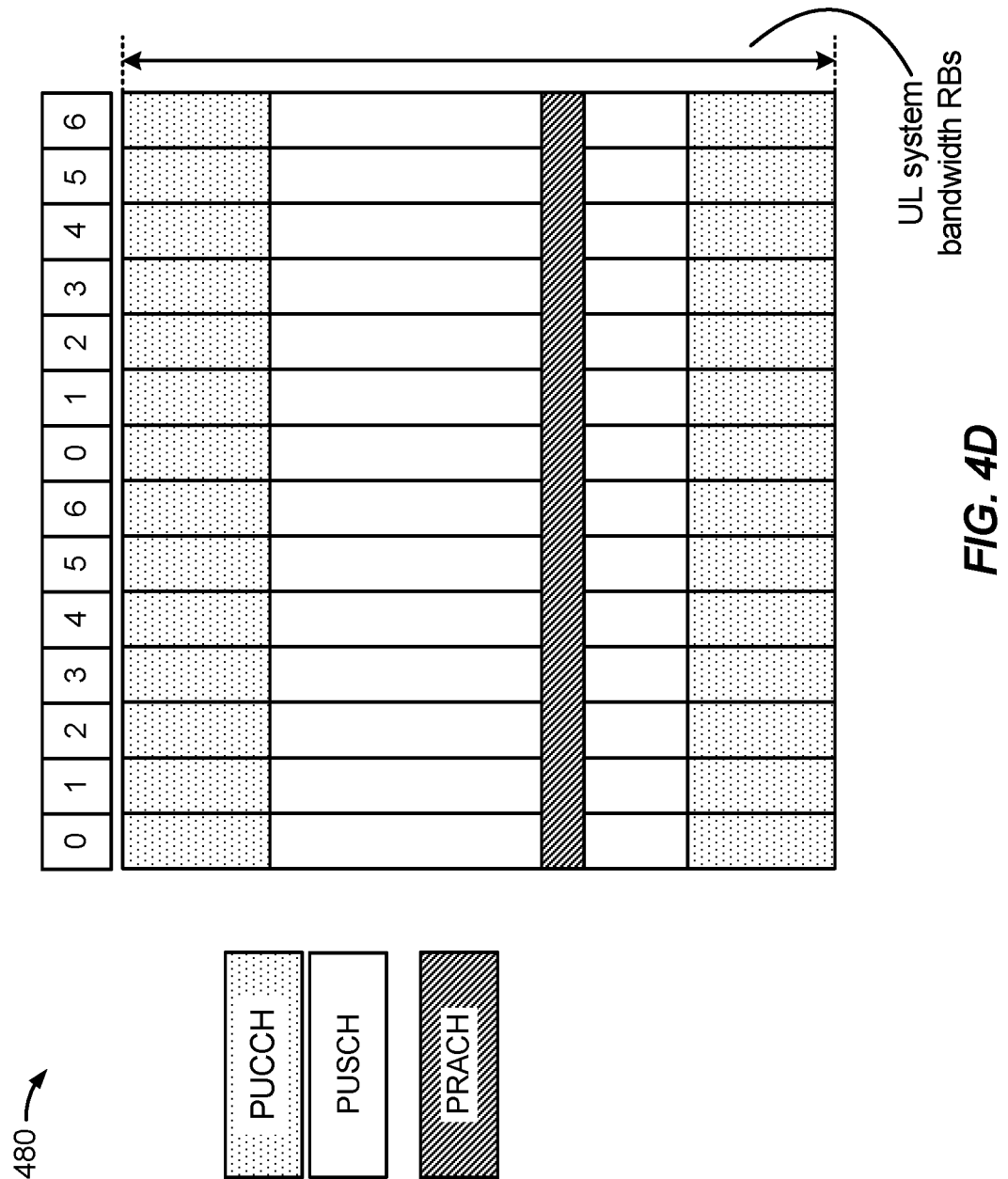

FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 480 illustrating an example of channels within the uplink frame structure, according to aspects of the disclosure. Other wireless communications technologies may have a different frame structures and/or different channels. In the time domain, a frame (10 ms) may be divided into 10 equally sized subframes (1 ms each). Each subframe may include two consecutive time slots (0.5 ms each).

A resource grid may be used to represent the two time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. For a normal cyclic prefix, an RB may contain 12 consecutive subcarriers in the frequency domain and 7 consecutive symbols (for downlink, OFDM symbols; for uplink, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry downlink reference (pilot) signals (DL-RS) for channel estimation at the UE. The DL-RS may include cell-specific reference signals (CRS) (also sometimes called "common reference signals"), UE-specific reference signals (UE-RS), and channel state information reference signals (CSI-RS). FIG. 4A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 4B illustrates an example of various channels within a downlink subframe of a frame. The physical control format indicator channel (PCFICH) is within symbol 0 of slot 0, and carries a control format indicator (CFI) that indicates whether the physical downlink control channel (PDCCH)

occupies 1, 2, or 3 symbols (FIG. 4B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 4B shows two RB pairs, each subset including one RB pair). The physical HARQ indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries an MIB, may be logically grouped with the PSCH and SSCH to form a synchronization signal (SS) block. The MIB provides a number of RBs in the downlink system bandwidth, a PHICH configuration, and a system frame number (SFN). The physical downlink shared channel (PDSCH) carries user data, broadcast system information not transmitted through the PBCH such as SIBs, and paging messages.

As illustrated in FIG. 4C, some of the REs carry demodulation reference signals (DMRS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the uplink.

FIG. 4D illustrates an example of various channels within an uplink subframe of a frame, according to aspects of the disclosure. A physical random access channel (PRACH) may be within one or more subframes within a frame based on the PRACH configuration. The PRACH may include six consecutive RB pairs within a subframe. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
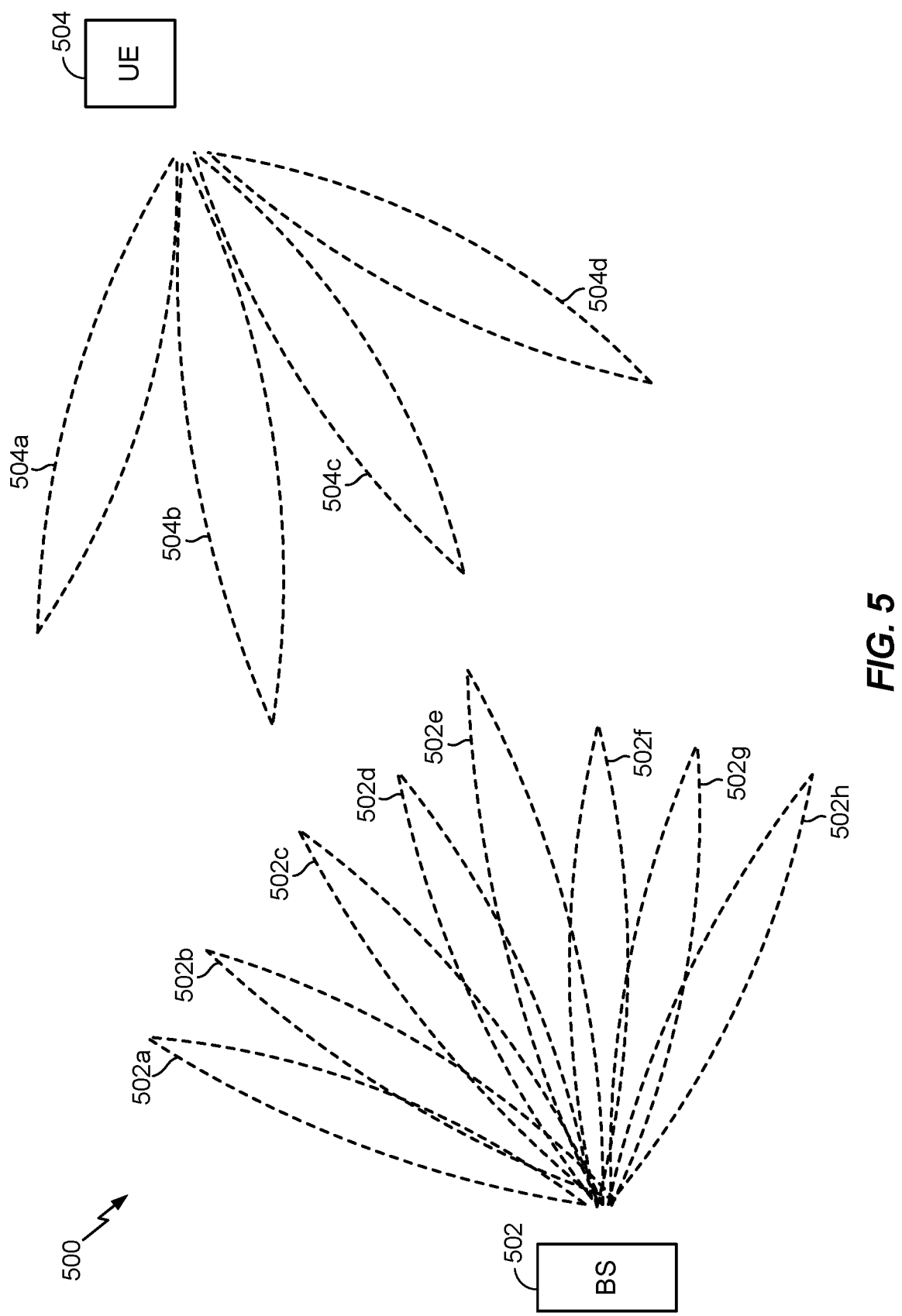
FIG. 5 is a diagram illustrating a base station in communication with a UE, according to aspects of the disclosure.

As noted above, some wireless communications networks, such as NR, may employ beamforming at mmW or near mmW frequencies to increase the network capacity. The use of mmW frequencies may be in addition to microwave frequencies (e.g., in the "sub-6" GHz, or FR1, band) that may also be supported for use in communication, such as when carrier aggregation is used. FIG. 5 is a diagram 500 illustrating a base station 502 in communication with a UE 504, according to aspects of the disclosure. In an aspect, the base station 502 and the UE 504 may correspond to any of the base stations and UEs described herein that are capable of beamforming, such as the base station 180 and UE 182, respectively, in FIG. 1.

Referring to FIG. 5, the base station 502 may transmit a beamformed signal to the UE 504 on one or more beams 502a, 502b, 502c, 502d, 502e, 502f, 502g, 502h, each having a beam identifier that can be used by the UE 504 to identify the respective beam. Where the base station is beamforming towards the UE 504 with a single array of antennas, the base station 502 may perform a "beam sweep" by transmitting first beam 502a, then beam 502b, and so on until lastly transmitting beam 502h. Alternatively, the base station 502 may transmit beams 502a-502h in some pattern, such as beam 502a, then beam 502h, then beam 502b, then beam 502g, and so on. Where the base station 502 is beamforming towards the UE 504 using multiple arrays of antennas, each antenna array may perform a beam sweep of a subset of the beams 502a-502h. Alternatively, each of beams 502a-502h may correspond to a single antenna or antenna array.

The UE 504 may receive the beamformed signal from the base station 502 on one or more receive beams 504a, 504b, 504c, 504d. Note that for simplicity, the beams illustrated in FIG. 5 represent either transmit beams or receive beams, depending on which of the base station 502 and the UE 504 is transmitting and which is receiving. Thus, the UE 504 may also transmit a beamformed signal to the base station 502 on one or more of the beams 504a-504d, and the base station 502 may receive the beamformed signal from the UE 504 on one or more of the beams 502a-502h. Because communication at high mmW frequencies utilizes directionality (e.g., communication via directional beams 502a-h and 504a-d) to compensate for higher propagation loss, the base station 502 and the UE 504 may need to align their transmit (and receive) beams during both initial network access and subsequent data transmissions to ensure maximum gain. The base station 502 and the UE 504 may determine the best beams for communicating with each other, and the subsequent communications between the base station 502 and the UE 504 may be via the selected beams.

Thus, the base station 502 and the UE 504 may perform beam training to align the transmit and receive beams of the base station 502 and the UE 504. For example, depending on environmental conditions and other factors, the base station 502 and the UE 504 may determine that the best transmit and receive beams are 502d and 504b, respectively, or beams 502e and 504c, respectively. The direction of the best transmit beam for the base station 502 may or may not be the same as the direction of the best receive beam, and likewise, the direction of the best receive beam for the UE 504 may or may not be the same as the direction of the best transmit beam.

However, due to UE mobility/movement, beam reconfiguration at the base station 502, and/or other factors, a downlink beam (e.g., comprising a downlink control link), which may have been the preferred active beam, may fail to be detected at the UE 504, or the signal quality may fall below a threshold, causing the UE 504 to consider it as a beam/link failure. A beam recovery procedure may be employed to recover from such a beam failure. A beam failure may refer to, for example, failure to detect a strong (e.g., with signal power greater than a threshold) active beam, which may, in some aspects, correspond to a control channel communicating control information from the network. In certain aspects, in order to facilitate beam failure detection, a UE (e.g., UE 504) may be preconfigured with beam identifiers (IDs) of a first set of beams (referred to as "set_q0") to be monitored, a monitoring period, an RSRP threshold, etc. The recovery may be triggered when an RSRP associated with the one or more monitored beams (as detected by the UE 504) falls below a threshold. The recovery process may include the UE 504 identifying a new beam, for example, from a second set of possible beams (corresponding to beam IDs that may be included in a second set, referred to as "set_q1"), and performing a RACH procedure using preconfigured time and frequency resources corresponding to the new preferred beam. The beam IDs corresponding to the beams in the second set of beams (set_q1) may be preconfigured at the UE 504 for use for beam failure recovery purposes. For example, the UE 504 may monitor DL beams (based on the beam IDs and resources identified in the second set), perform measurements, and determine (e.g., based on the measurements) which beam out of all received and measured beams may be the best for reception at the UE 504 from the UE's 504 perspective.

If beam correspondence is assumed (i.e., the direction of the best receive beam used by the UE 504 is also considered the best direction for the transmit beam used by the UE 504), then the UE 504 may assume the same beam configuration for both reception and transmission. That is, based on monitoring downlink reference signals from the base station 502, the UE 504 can determine its preferred uplink transmit beam weights, which will be the same as for the downlink receive beam used for receiving the downlink reference signals.

Where beam correspondence is not assumed (e.g., deemed not suitable in the given scenario or for other reasons), the UE 504 may not derive the uplink transmit beam from the downlink receive beam. Instead, separate signaling is needed to select the uplink transmit and downlink receive beam weights and for the uplink-to-downlink beam pairing. The UE 504 may perform a RACH procedure (e.g., using the preconfigured time and frequency resources indicated in the second set of beams, set_q1) to identify the uplink transmit beam. Performing the RACH procedure using the preconfigured time and frequency resources may comprise, for example, transmitting a RACH preamble on one or more uplink transmit beams (corresponding to the beam IDs in the second set of beams, set_q1) on allocated RACH resources corresponding to the one or more beams. Based on the RACH procedure, the UE 504 may be able to determine and confirm with the base station 502 which UL direction may be the best beam direction for an UL channel (e.g., PUCCH). In this manner, both UL transmit and DL receive beams may be reestablished and beam recovery may be completed.

In certain aspects, carrier aggregation may be utilized where the communication between the base station 502 and the UE 504 is supported by multiple carrier components (e.g., a PCell and one or more SCells). For example, the PCell may correspond to a microwave frequency band and/or other relatively lower frequency band (e.g., an FR1 band or sub-6 band) compared to the mmW frequency band, while the one or more SCells may correspond to mmW frequency bands (e.g., an FR2 band). In an aspect, when PCell and SCell operation is supported in the communications system and there is no correspondence between uplink receive and downlink transmit beams, assistance from the PCell may be leveraged to enhance an SCell recovery procedure. In other words, if the beam/link failure occurs in the SCell, assistance from the PCell may be leveraged to facilitate the SCell beam recovery procedure. Such an approach may reduce the delays and latencies associated with the beam recovery procedure and allow for faster recovery of a failed link in the SCell.

In the examples illustrated below, for simplicity, the PCell and SCell are shown to be associated with a single base station (e.g., the hardware/circuitry for implementing the PCell and SCell may be collocated at the same base station). However, in some other configurations, the PCell and SCell may be associated with different base stations that may be synchronized.

Figure 6:
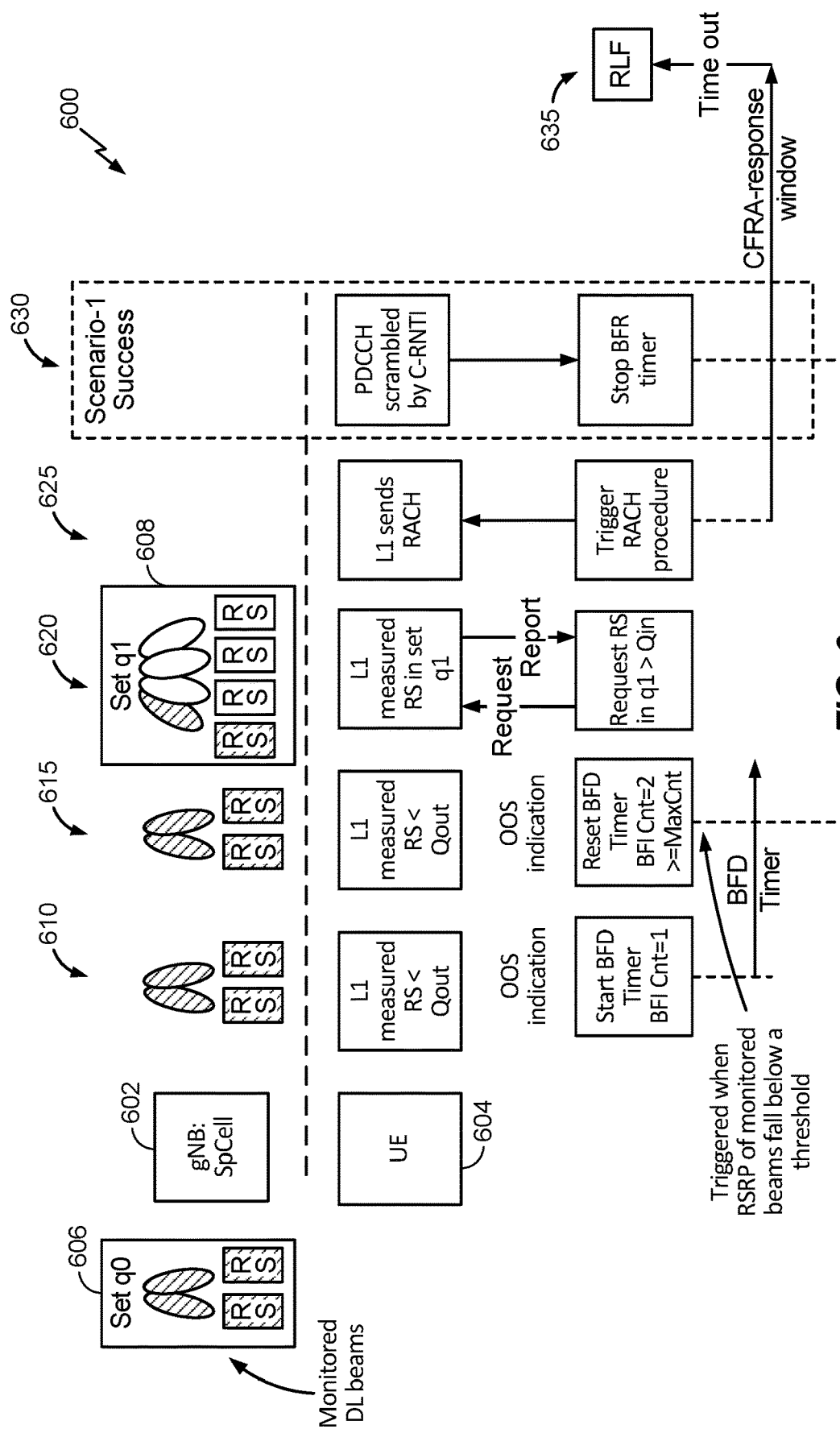
FIG. 6 is a diagram of an exemplary random access channel (RACH)-based SpCell beam failure recovery procedure, according to aspects of the disclosure.

FIG. 6 is a diagram 600 of an exemplary RACH-based SpCell beam failure recovery procedure, according to aspects of the disclosure. In the example of FIG. 6, a PCell or a primary (i.e., in active use) SCell (together referred to as an "SpCell") is supported by a base station 602 (illustrated as a "gNB," and which may correspond to any of the base stations described herein, such as base station 502). A UE 604 (which may correspond to any of the UEs described herein, such as UE 504) monitors the received signal strength (e.g., RSRP) of periodic reference signals transmitted by the base station 602 on a first set ("set_q0") of downlink transmit beams 606 of the SpCell. The first set of downlink transmit beams 606 may correspond to one or more of beams 502*a-h* in FIG. 5 in the mmW frequency range. The first set of downlink transmit beams 606 is referred to as the "failure detection resource set" because the base station 602 sends the beam IDs of the beams in the first set of downlink transmit beams 606 to the UE 604 to enable the UE 604 to monitor these beams to determine whether or not the downlink control link (i.e., a control channel communicating control information from the network) between the base station 602 and the UE 604 is active. In the example of FIG. 6, the first set of downlink transmit beams 606 includes two beams. However, there may be only one beam or more than two beams in the first set of downlink transmit beams 606.

At 610, the UE 604 fails to detect a periodic reference signal transmitted on at least one of the beams in the first set of downlink transmit beams 606, and/or detects that a quality metric (e.g., RSRP) associated with the reference signal has fallen below a signal quality threshold (represented in FIG. 6 as "Qout"). The Qout threshold may be configured by the base station 602. More specifically, the Layer 1 ("L1" in FIG. 6) functionality of the UE 604 (e.g., implemented in the RX processor 356) detects that the measured quality metric of the periodic reference signal is below the Qout threshold, and sends an out-of-sync (OOS) indication to the controller/processor 359 (which implements the Layer 2 and Layer 3 functionality of the UE 604). In response to receiving the OOS indication, the controller/processor 359 of the UE 604 starts a beam failure detection (BFD) timer and initializes a beam failure indicator (BFI) counter to "1."

At 615, the UE 604 again fails to detect the periodic reference signal transmitted on the at least one of the beams in the first set of downlink transmit beams 606, and/or again detects that the quality metric associated with the reference signal has fallen below the Qout threshold. Again, more specifically, the Layer 1 functionality of the UE 604 detects that the measured quality metric of the periodic reference signal is below the Qout threshold, and sends another OOS indication to the controller/processor 359. The controller/processor 359 increments the BFI count to "2." Because the BFI count has reached the maximum count ("MaxCnt") threshold while the BFD timer is running, the UE 604 determines that there has been a beam failure of the at least one beam (e.g., a downlink control beam) in the first set of downlink transmit beams 606. Because there is a failure of a downlink control beam (corresponding to the downlink control channel communicating control information from the network), the UE 604 assumes that there is also a failure of the corresponding uplink control beam (corresponding to the uplink control channel for communicating control information to the network). As such, the UE 604 needs to identify a new downlink control beam and re-establish an uplink control beam.

Thus, at 620, in response to the beam failure detection at 615, the UE 604 initiates a beam failure recovery procedure. More specifically, the controller/processor 359 of the UE 604 requests that the Layer 1 functionality of the UE 604 (implemented by the RX processor 356) identify at least one beam in a second set ("set_q1") of downlink transmit beams 608 that carries a periodic reference signal with a received signal strength greater than a signal quality threshold (represented as "Qin"). The second set of downlink transmit beams 608 may correspond to one or more of beams 502a-h in FIG. 5 in the mmW frequency range. The second set of downlink transmit beams 608 is referred to as the "candidate beam reference signal list." The UE 604 may receive both the beam IDs of the beams in the second set of downlink transmit beams 608 and the Qin threshold from the base station 602. In the example of FIG. 6, the second set of downlink transmit beams 608 includes four beams, one of which (shaded) carries periodic reference signals having a received signal strength greater than the Qin threshold. However, as will be appreciated, there may be more or fewer than four beams in the second set of downlink transmit beams 608, and there may be more than one beam that meets the Qin threshold. The RX processor 356 reports the identified candidate beam to the controller/processor 359. The identified candidate beam can then be used as the new downlink control beam, although not necessarily immediately.

At 625, to re-establish an uplink control beam, the UE 604 performs a RACH procedure on the one or more candidate downlink transmit beams identified at 620 (one in the example of FIG. 6). More specifically, the controller/processor 359 instructs the RX processor 356 to send a RACH preamble (which may be pre-stored or provided to the UE 604 by the base station 602) to the base station 602. The RX processor 356 sends the RACH preamble (also referred to as a Message 1, Msg1, or RACH request) on one or more uplink transmit beams corresponding to the one or more candidate downlink transmit beams identified at 620 on preconfigured RACH resources for the one or more candidate uplink transmit beams. The preconfigured RACH resources may correspond to the SpCell (e.g., in the mmW band). Although not illustrated in FIG. 6, at 625, the UE 604 also starts a beam failure recovery (BFR) timer that defines a contention-free random access (CFRA) window.

The one or more candidate downlink transmit beams identified at 620 can include beams that are different than the downlink transmit beam associated with the beam failure. As used herein, a "beam" is defined by beam weights associated with an antenna array of the UE 604. Hence, in some aspects, whether used for uplink transmission by the UE 604 or downlink reception by the UE 604, the weights applied to each antenna in the array to construct the transmitted or received beam define the beam. As such, the one or more candidate uplink transmit beams on which the RACH preamble is sent may have different weights than the downlink transmit beam associated with the beam failure, even if such candidate uplink transmit beam is in generally a similar direction as the downlink transmit beam indicated to be failing.

At 630, the base station 602 transmits a RACH response (referred to as a "Msg1 response," or a "Msg2") to the UE 604 with a cell-radio network temporary identifier (C-RNTI) via a PDCCH associated with the SpCell. For example, the response may comprise cyclic redundancy check (CRC) bits scrambled by the C-RNTI. After the RX processor 356 of the UE 604 processes the received response with the C-RNTI via the SpCell PDCCH from the base station 602 and determines that the received PDCCH is addressed to the C-RNTI, the controller/processor 359 determines that the beam failure recovery procedure has completed and stops the BFR timer started at 625. In an aspect, the C-RNTI may be mapped to a beam direction determined by the base station 602 to be the best direction for an UL channel (e.g., PUCCH) for the UE 604. Accordingly, upon receipt of the response with C-RNTI from the base station 602, the UE 604 may be able to determine the optimal UL transmit beam that is best suited for the UL channel.

The operations at 630 are part of a first scenario in which the UE 604 successfully recovers from the beam failure detected at 615. However, such a recovery may not always occur, or at least not before the BFR timer started at 625 times out. If the BFR timer expires before the beam failure recovery procedure completes successfully, then at 635, the UE 604 determines that a radio link failure (RLF) has occurred.

A UE can use supplementary uplink (SUL) to improve uplink coverage. In SUL operation, one downlink carrier is paired with two possible uplink carrier candidates, one in a low-band frequency and the other is in a high-band frequency. In that way, SUL allows the UE to use an additional lower-frequency carrier for uplink transmission instead of, or in addition to, the dedicated higher-frequency uplink carrier. Due to the lower frequency of the SUL, the uplink coverage when using the SUL can be significantly improved over the coverage provided by the dedicated uplink carrier.

For example, in a sub-6 GHz deployment scenario, the downlink and uplink channels of the PCell may operate in a higher frequency band (e.g., 5 GHz), and the SUL may operate in a lower frequency band (e.g., 2 GHz). There are no downlink reference signals for the SUL, so the timing information for the SUL is derived from the higher-frequency uplink channel, here the 5 GHz uplink channel. In addition, while a RACH request can be sent on the SUL, the RACH response is received on the higher-frequency downlink channel, here the 5 GHz downlink channel.

SUL operation can be extended to mmW frequencies. For example, the downlink and uplink channels of the PCell may operate in a higher mmW frequency band (e.g., 39 GHz), and the SUL may operate in a lower mmW frequency band (e.g., 28 GHz). The lower frequency band (e.g., 28 GHz) could be used for enhancing uplink coverage or for uplink-heavy UEs. The present disclosure describes methods for beam failure recovery in mmW deployments with SUL. For example, in a deployment with a mmW PCell and SUL, assistance from the SUL can be used to enable recovery of the uplink beam in the PCell, as described further below. This is in contrast to the current mechanism described above with reference to FIG. 6, in which the UE informs the base station of a beam failure on an uplink beam corresponding to one of the candidate downlink beams. More specifically, current BFR mechanisms attempt recovery via RACH on the failing frequency band. In the present disclosure, the UE can transmit an uplink beam (control or data) via a different band (the SUL) to indicate failure and the preferred beam of a primary cell. If RACH is still needed for recovery, the UE can use the SUL to provide prior information to the base station.

Figure 7A:
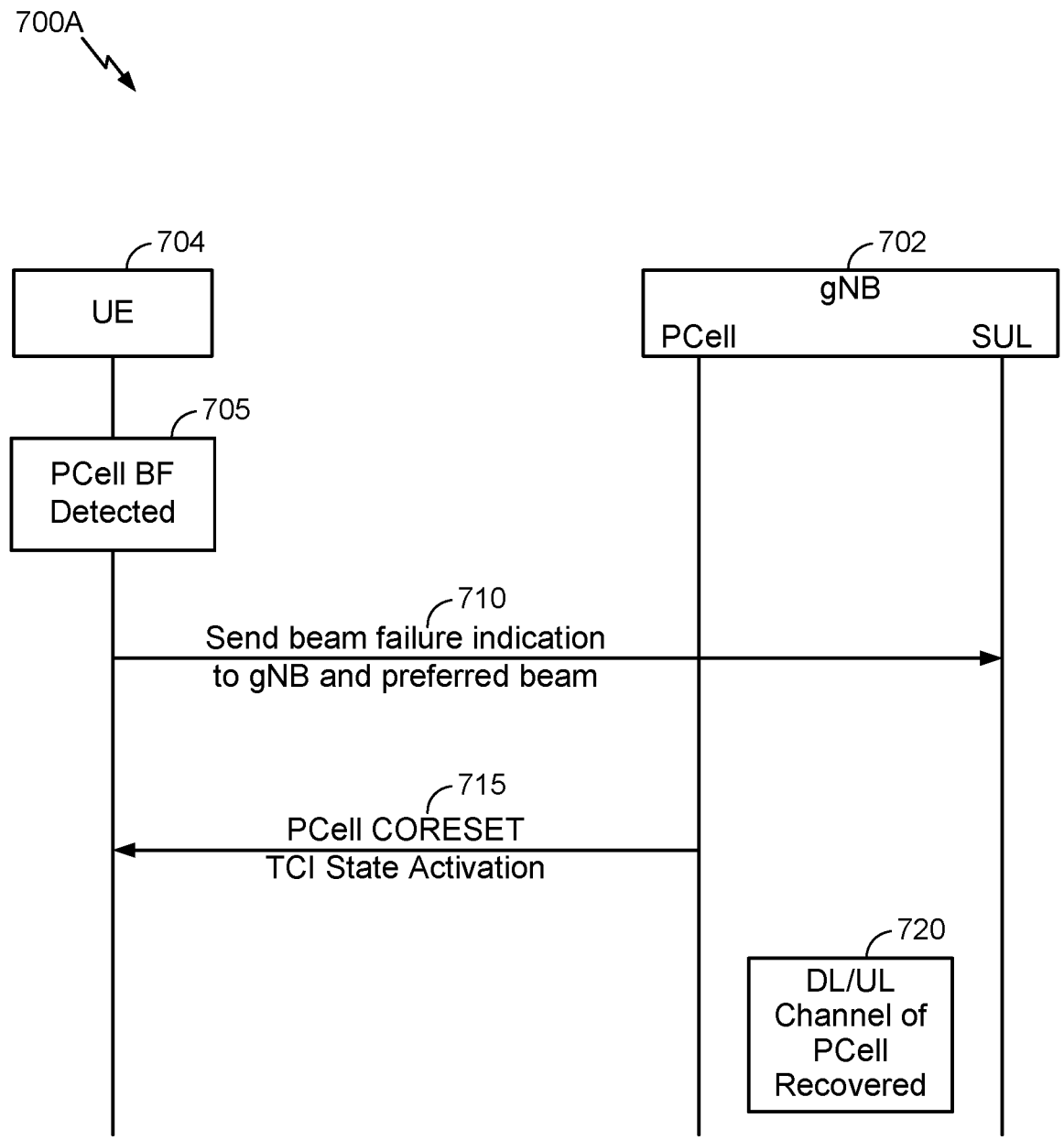
FIG. 7A is a diagram of an exemplary primary cell (PCell) beam recovery procedure with SUL assistance and assuming beam correspondence, in accordance with aspects of the disclosure.

FIG. 7A is a diagram 700A of an exemplary PCell beam recovery procedure with SUL assistance and assuming beam correspondence, in accordance with aspects of the disclosure. The procedure illustrated in FIG. 7A may be performed by a base station 702 (illustrated as a "gNB") and a UE 704, which may correspond to any of the base stations and UEs, respectively, described herein.

At 705, the UE 704 detects a PCell downlink beam failure (BF), as described above with reference to, for example, 610 and 615 of FIG. 6. At 710, upon detection of the PCell beam failure, the UE 704 sends a beam failure indication to the base station 702 (e.g., in a special scheduling request (SR)) via the SUL. The message carrying the beam failure indication may also include a preferred candidate downlink beam to replace the failed PCell, which may be identified as in 620 of FIG. 6. Furthermore, the beam failure indication sent via the SUL may be sent using a beam different than the beam associated with the beam failure. As described above, a "beam" is defined by beam weights associated with an antenna array of the UE. Hence, in some aspects, whether used in transmission by the UE 704 or reception by the UE 704, the weights applied to each antenna element in the antenna array to construct the transmitted or received beam define the beam. This being the case, the beam failure indication can be sent via the SUL on a beam having different weights than the downlink beam indicated to be failing, even if such SUL beam is in generally a similar direction as the downlink beam indicated to be failing. In one example, the beam failure indication is sent using the same beam as the preferred candidate downlink beam that is to replace the failed downlink beam. Additionally or alternatively, the beam failure indication sent via the SUL may be sent using a different carrier frequency and/or different time/frequency resources than the downlink beam associated with the beam failure. In implementations where the message carrying the beam failure indication includes a preferred candidate downlink beam, this preferred candidate downlink beam may have been previously indicated by the base station 702 and stored in, for example, BeamFailureRecoveryConfig parameter(s) in the RRC layer. Such beam failure recovery parameters can be received from the base station 702 in a unicast message using PDCCH or PDSCH or broadcast in PDSCH. In various examples, contention-free RACH information can be carried in the broadcast PDSCH.

At 715, in response to receiving the beam failure indication, the base station 702 configures the preferred candidate downlink beam identified in the beam failure indication message as the new PCell. The base station then sends a PCell control resource set (CORESET) transmission configuration indicator (TCI) state activation signal to the UE 704 on the new PCell (i.e., the downlink beam identified in the beam failure indication message). The CORESET TCI state activation signal indicates the resources, for a control channel associated with the preferred candidate beam, that have been activated by the base station 702.

At 720, the base station 702 determines that the downlink and uplink channel of the PCell has been recovered. Because beam correspondence is assumed (i.e., the direction of the best receive beam used by the UE 704 is also considered the best direction for the transmit beam used by the UE 704), then the UE 704 may assume the same beam configuration for both reception and transmission. Thus, the UE 704 uses the same beam weights for the uplink beam for the PCell that it used to receive the downlink channel/beam of the PCell. The UE 704 may determine the appropriate beam weights for the downlink receive beam based on monitoring downlink reference signals received from the base station 702 on the downlink channel of the PCell.

Figure 7B:
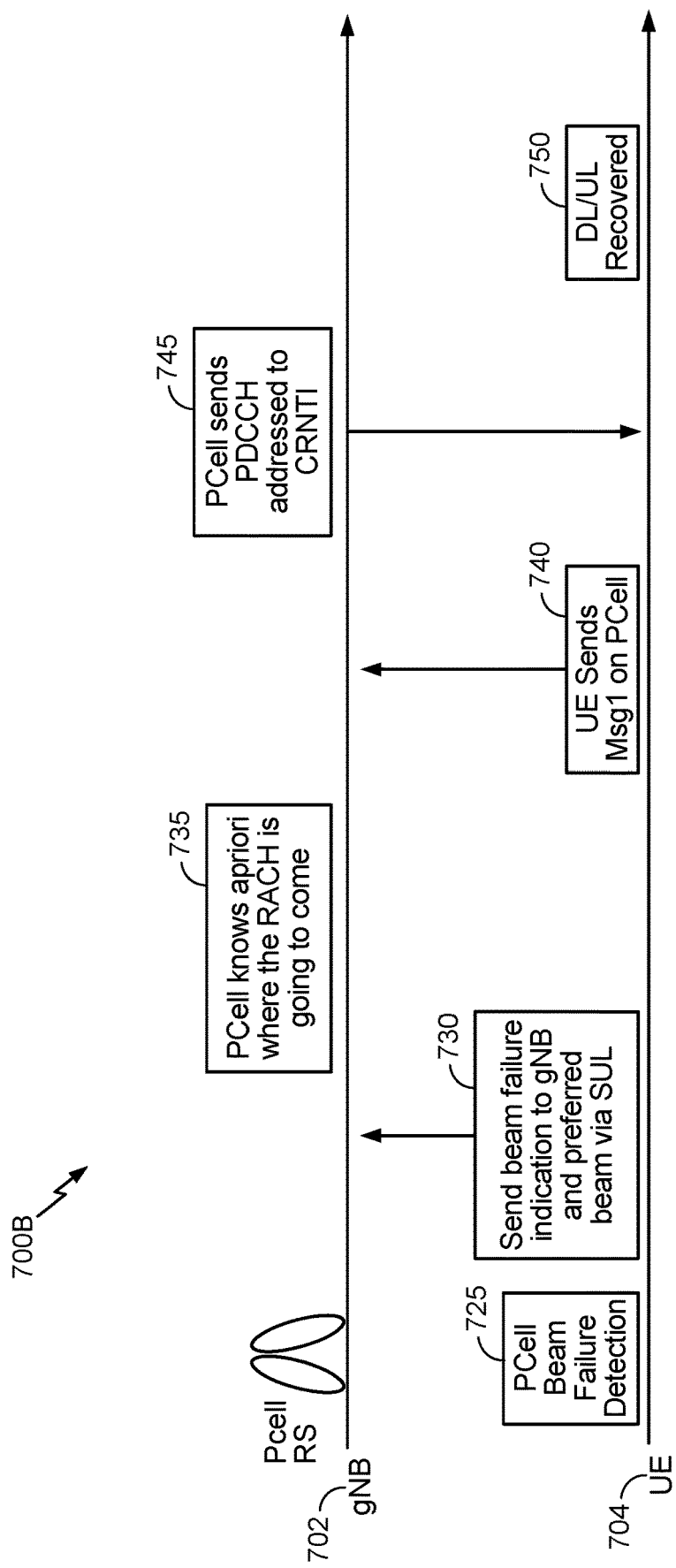
FIG. 7B is a diagram of an exemplary PCell beam recovery procedure with SUL assistance and without assuming any beam correspondence, in accordance with aspects of the disclosure.

FIG. 7B is a diagram 700B of an exemplary PCell beam recovery procedure with SUL assistance and without assuming any beam correspondence, in accordance with aspects of the disclosure. The procedure illustrated in FIG. 7B may be performed by the base station 702 and the UE 704.

At 725, the UE 704 detects a PCell downlink beam failure, as described above with reference to, for example, 610 and 615 of FIG. 6. At 730, upon detection of the PCell beam failure, the UE 704 sends a beam failure indication to the base station 702 (e.g., in a special SR) on the SUL. The message carrying the beam failure indication may also include a preferred candidate downlink beam to replace the failed PCell, which may be identified as in 620 of FIG. 6 and aspects of 710 of FIG. 7A.

At 735, in response to receiving the beam failure indication, the base station 702 configures the preferred candidate downlink beam identified in the beam failure indication message as the new PCell. Because the base station 702 has configured the new PCell, it knows a priori from where the subsequent Msg1 is going to be received. That is, the base station 702 knows that the UE 704 will send the subsequent Msg1 on the new PCell and can monitor it accordingly. For example, the base station 702 may reserve a set of RACH resources associated with the new PCell for performing RACH. The set of resources associated with the PCell beam recovery may include resources (e.g., in the frequency band corresponding to the PCell) for receiving RACH preambles via the new PCell.

At 740, the UE 704 sends a RACH preamble (which may be pre-stored or provided to the UE 704 by the base station 702) to the base station 702, as described above with reference to, for example, 625 of FIG. 6. The UE 704 sends the RACH preamble (i.e., Msg1), for example, on a candidate uplink beam for the new PCell configured at 735. That is, when the base station 702 configures the new PCell at 735, it configures candidate uplink and downlink beams for the PCell, but the candidate uplink and downlink beams may not be confirmed as the new uplink and downlink beams until after the RACH procedure.

At 745, the base station 702, via the candidate downlink beam for the new PCell configured at 735, transmits a RACH response (referred to as a "Msg1 response" or a "Msg2") to the UE 704 as discussed above with reference to, for example, 630 of FIG. 6. More specifically, the base station 702 sends the PDCCH addressed to the C-RNTI, as at 630 of FIG. 6. The RACH request and RACH response (via the PDCCH with the CRC scrambled by the C-RNTI) is a two-way mechanism to recover/reconfigure the uplink and downlink beams for the new PCell. Thus, after the UE 704 processes the received response, the UE 704 is able to determine the optimal uplink transmit beam that is best suited for the uplink channel from the DCI in the PDCCH (the base station 702 determines the DCI from the Msg1 reception).

At 750, the UE 704 reconfigures the TCI state for the PDCCH and PUCCH. The reconfiguration of the TCI state confirms that the downlink beam identified at 730 is to be used for the PDCCH of the PCell, and the uplink transmit beam determined at 745 is to be used for the PUCCH of the PCell.

Although the foregoing has described beam failure recovery procedures in which the UE 704 establishes a new uplink transmit beam for the PCell, as will be appreciated, the techniques described herein are equally applicable to selecting a new uplink transmit beam in response to failure of the SCell.

In some cases, the SUL beam may fail and need to be recovered. Because there are no downlink resources corresponding to the SUL beam for the UE to monitor, the UE can instead monitor downlink reference signals of the PCell (operating in a mmW frequency band) as a proxy for the SUL beam. This assumes that quasi-collocation (QCL) across the frequency bands used by the PCell and the SUL could be shared. Beams may be quasi-collocated, meaning that they appear to the receiver as having the same parameters, regardless of whether or not the transmitting antennas themselves are physically collocated. In NR, there are four types of QCL relations (Type A to Type D). Specifically, a QCL relation of a given type means that certain parameters about a second reference signal on a second beam can be derived from information about a source reference signal on a source beam. Thus, if the source reference RF signal is QCL Type A, the receiver can use the source reference RF signal to estimate the Doppler shift, Doppler spread, average delay, and delay spread of a second reference signal transmitted on the same channel. If the source reference signal is QCL Type B, the receiver can use the source reference signal to estimate the Doppler shift and Doppler spread of a second reference signal transmitted on the same channel. If the source reference signal is QCL Type C, the receiver can use the source reference signal to estimate the Doppler shift and average delay of a second reference signal transmitted on the same channel. If the source reference signal is QCL Type D, the receiver can use the source reference signal to estimate the spatial receive parameter of a second reference signal transmitted on the same channel.

Beam failure recovery for the SUL may be triggered when the received signal strength of the monitored downlink reference signals transmitted on the PCell falls below a threshold, similar to 610 and 615 of FIG. 6. However, the threshold may be derived based on UE physical parameters, such as measured beam quality (e.g., RSRP, SINR, etc.), UE transmit beam parameters for the corresponding uplink of the downlink proxy, maximum permissible exposure (MPE) guidelines, etc. More specifically, the UE is trying to determine the quality of its uplink beam based on receiving downlink reference signals that are transmitted by the base station. The UE may not be able to transmit with the same power level or beamforming gain(s) as the base station, so some readjustment is made for the threshold Qout to be specific/appropriate to the UE's physical parameters. The beam failure indication can be transmitted on the uplink channel of the PCell, which can then aid SUL beam failure recovery.

Figure 8:
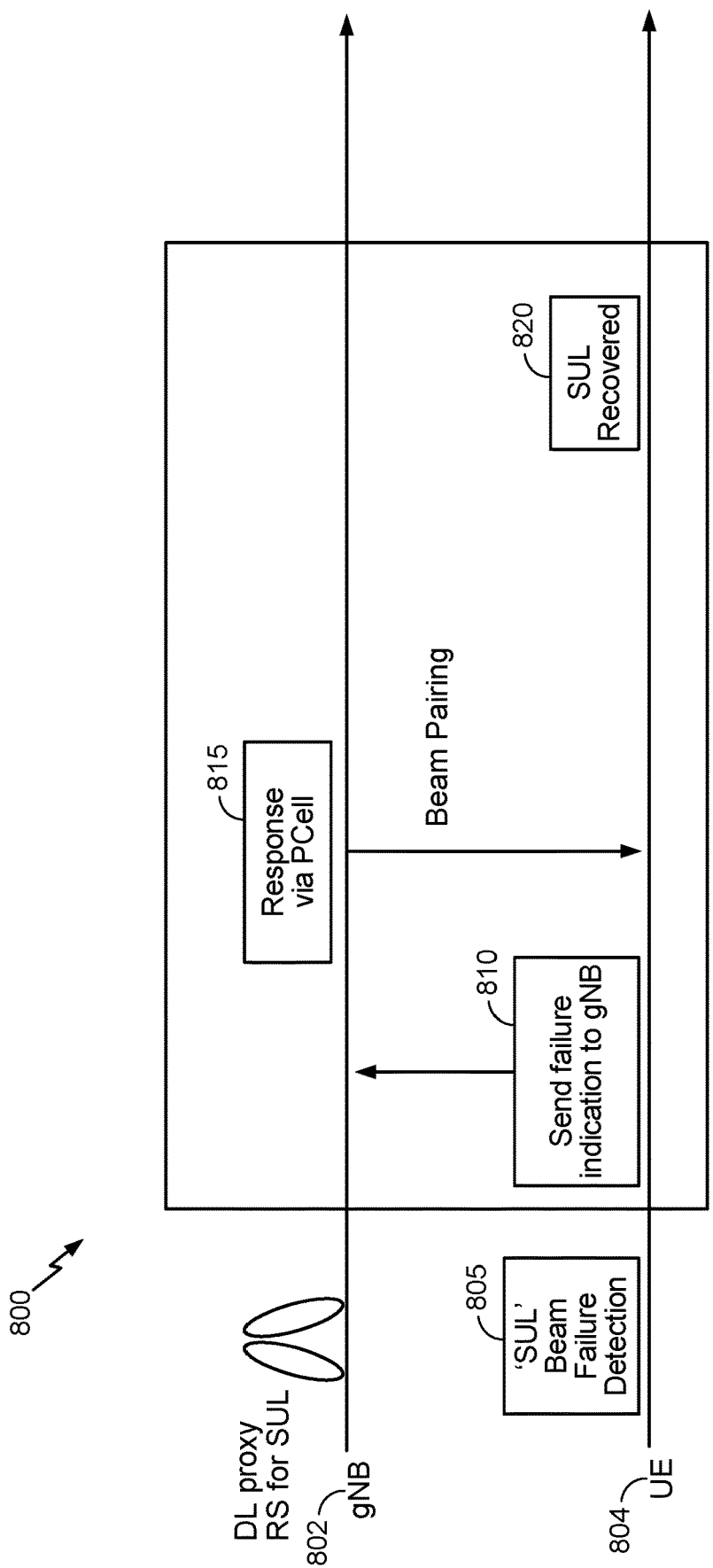
FIG. 8 is a diagram of an exemplary SUL beam recovery procedure with PCell assistance, in accordance with aspects of the disclosure.

FIG. 8 is a diagram 800 of an exemplary SUL beam recovery procedure with PCell assistance, in accordance with aspects of the disclosure. The procedure illustrated in FIG. 8 may be performed by a base station 802 (illustrated as a "gNB") and a UE 804, which may correspond to any of the base stations and UEs, respectively, described herein.

At 805, the UE 804 detects a SUL beam failure. As described above, a beam failure of the SUL may be detected when the received signal strength of the monitored downlink reference signals transmitted on the PCell falls below a UE physical-parameter-specific threshold, similar to 610 and 615 of FIG. 6. Note, however, that the signal strength threshold may be higher for a SUL beam failure than for a PCell beam failure, so that the UE 804 does not consider both the SUL and the PCell beams to have failed.

At 810, upon detection of the SUL beam failure, the UE 804 sends a SUL beam failure indication to the base station 802 (e.g., in a special SR) on the PCell. At 815, the UE 804 receives a response from the base station 802 via the PCell. The UE 804 is able to use the response to perform a beam pairing operation to establish a new SUL beam, as described in greater detail with reference to FIG. 9.

At 820, the UE 804 reconfigures the TCI state for the SUL. The reconfiguration of the TCI state confirms that the uplink transmit beam determined at 815 is to be used for the SUL.

In an aspect, the UE 804 can attempt to recover from a SUL beam failure via a RACH procedure. Generally, the RACH response (Msg2) is received on the PDCCH of the beam failure recovery CORESET of the PCell. To distinguish from the usual PCell beam failure recovery response, the RACH response may include additional bits, or use a different scrambling, or separate resources. For example, a first solution would be to configure a separate beam failure recovery CORESET for each of the different types of recovery, that is, PCell recovery, SCell recovery, and SUL recovery. A second solution would be to configure the same beam failure recovery CORESET for each of the different types of recovery, but to scramble the PDCCH with different RNTIs for the different types of recovery. A third solution would be to configure the same beam failure recovery CORESET for each of the different types of recovery, and to use the same DCI, but with additional bits to convey which type of recovery response it is.

Figure 9:
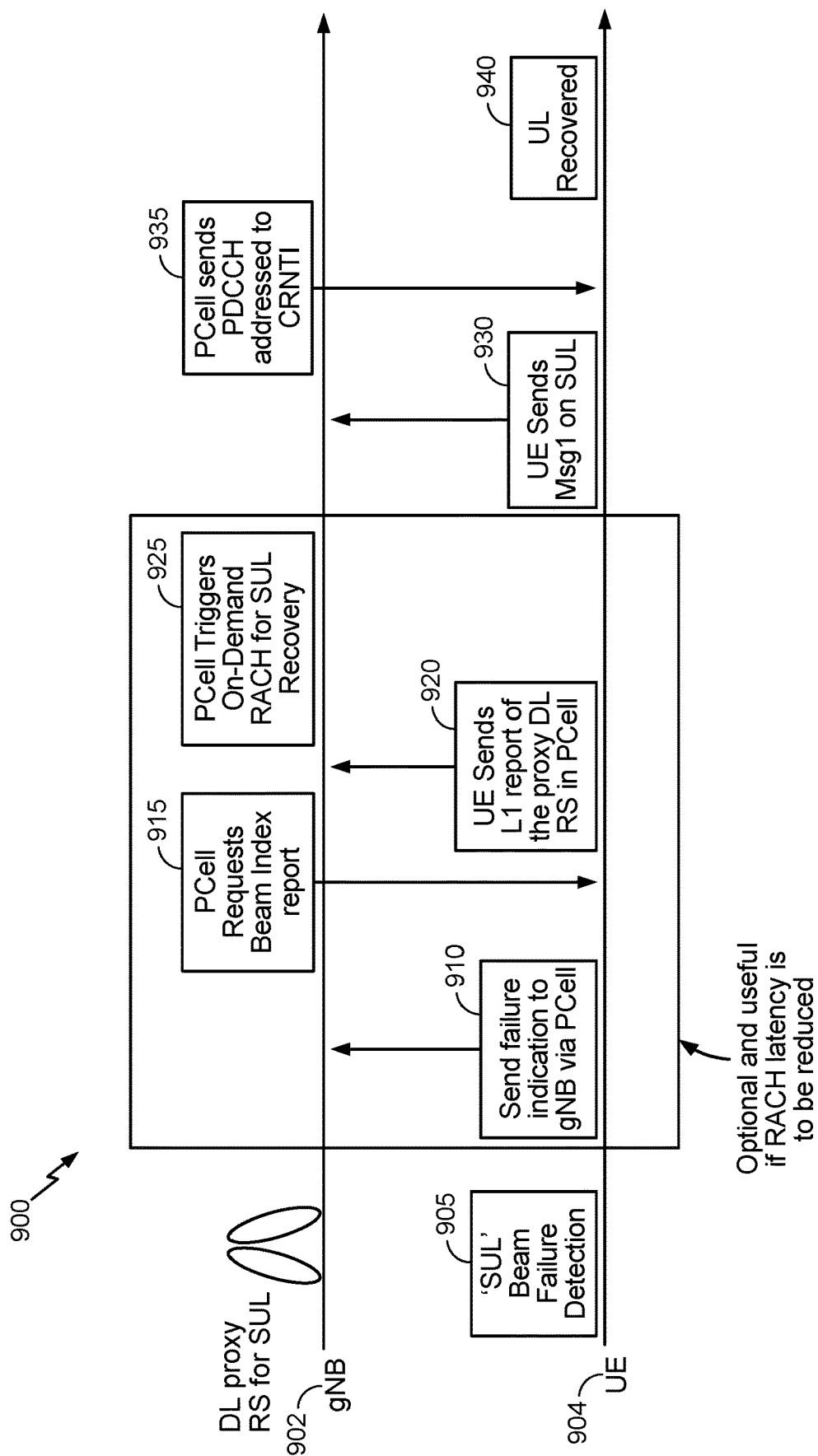
FIG. 9 is a diagram of an exemplary SUL beam recovery procedure with RACH assistance, in accordance with aspects of the disclosure.

FIG. 9 is a diagram 900 of an exemplary SUL beam recovery procedure with RACH assistance, in accordance with aspects of the disclosure. The procedure illustrated in FIG. 9 may be performed by a base station 902 (illustrated as a "gNB") and a UE 904, which may correspond to any of the base stations and UEs, respectively, described herein.

At 905, the UE 904 detects a SUL beam failure. As described above, a beam failure of the SUL may be detected when the received signal strength of the monitored downlink reference signals transmitted on the PCell falls below a UE physical-parameter-specific threshold, similar to 610 and 615 of FIG. 6. Note, however, that the signal strength threshold may be higher for a SUL beam failure than for a PCell beam failure, so that the UE 904 does not consider both the SUL and the PCell beams to have failed.

At 910, upon detection of the SUL beam failure, the UE 904 sends a SUL beam failure indication to the base station 902 (e.g., in a special SR) on the PCell.

At 915, in response to receiving the SUL beam failure indication, the base station 902, via the PCell, requests a beam index report from the UE 904. Specifically, the base station 902 may transmit a specialized PDCCH order, such as a specially configured message transmitted via the PCell, that includes a request for an L1-RSRP report for the PCell downlink beam(s) and/or a request for reporting a beam ID corresponding to a preferred downlink beam as determined by the UE 904.

At 920, in response to the request for the beam index report for the PCell downlink beam(s), and based on the information regarding the beam ID(s) and corresponding resource(s), the UE 904 measures downlink reference signals (e.g., SSBs and/or other reference signals) communicated via downlink beams of the PCell. Typically, the UE 904 would be attempting to identify the best/preferred downlink beam for a new PCell, as discussed above with respect to 620 of FIG. 6. However, in the present case, the PCell has not failed. Instead, the base station 902 needs the beam index report to assist the UE 904 in reestablishing the SUL. Thus, the UE 904 may generate an L1-RSRP report for the downlink beam(s) based on the measurements, but does not identify a preferred downlink beam for the downlink channel (e.g., PDCCH) of the PCell. The UE 904 may send the L1-RSRP report to the base station 902 via a PUCCH of the PCell.

At 925, based on the received report via the PUCCH in the PCell, the base station 902 triggers on-demand RACH for SUL recovery. For example, the base station 902 may reserve a set of RACH resources associated with the SUL for performing RACH. The set of resources associated with the SUL beam recovery may include resources (e.g., in the frequency band corresponding to the SUL) for receiving RACH preambles on the SUL beam.

Operations 910 to 925 are optional because they reduce RACH latency, which may not always be necessary. Where RACH latency is not a concern, the procedure can proceed from operation 905 to 930.

At 930, the UE 904 sends a RACH preamble (which may be pre-stored or provided to the UE 904 by the base station 902) to the base station 902, as described above with reference to, for example, 625 of FIG. 6. The UE 904 sends the RACH preamble (Msg1) on a new candidate SUL beam. Note that the beam is re-established only after 935/940 because the UE 904 needs confirmation from the base station 902.

At 935, the base station 902, via the PCell, transmits a RACH response (Msg2) to the UE 904 as discussed above with reference to, for example, 630 of FIG. 6. More specifically, the base station 902 sends the PDCCH addressed to the C-RNTI, as at 630 of FIG. 6.

At 940, the UE 904 reconfigures the TCI state for the SUL. The reconfiguration of the TCI state confirms that the uplink transmit beam determined at 930 is to be used for the SUL.

Figure 10:
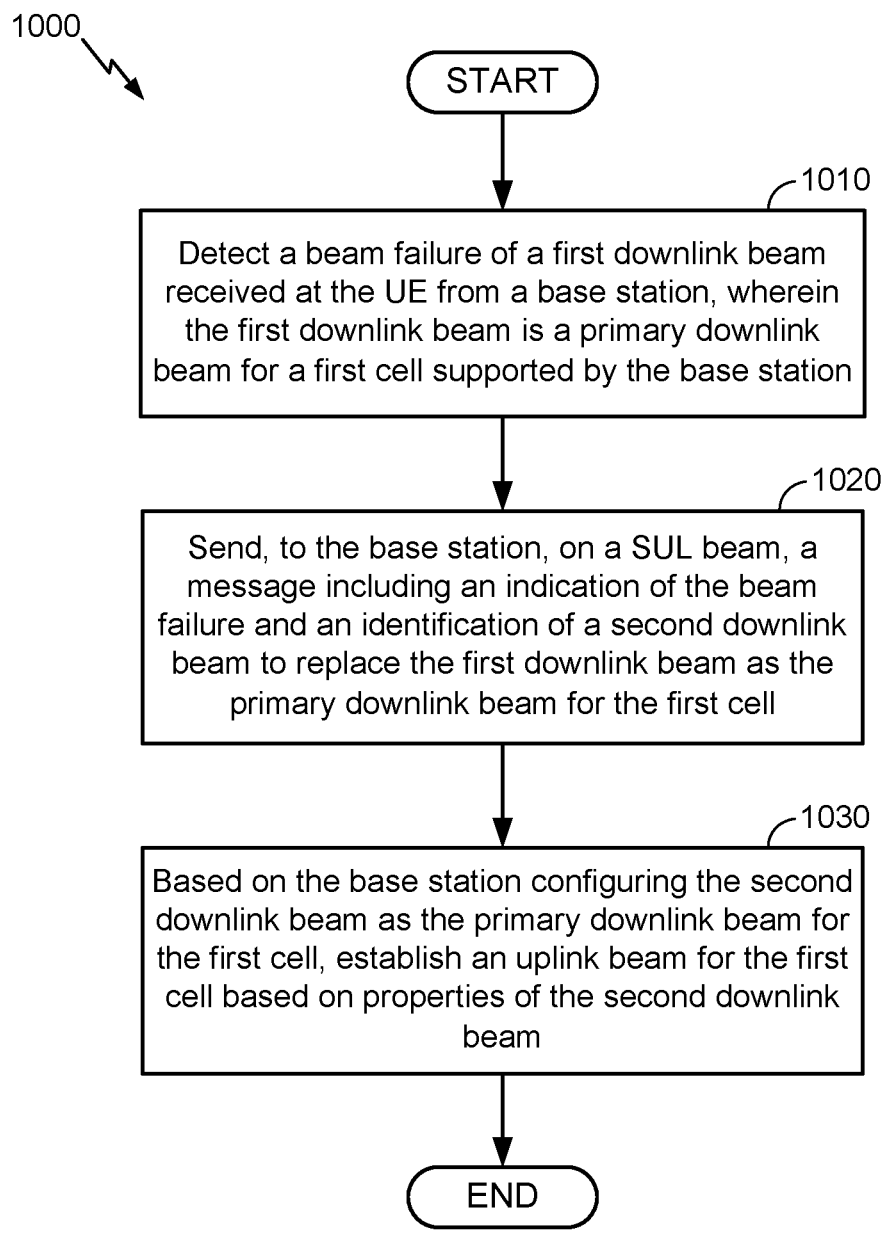
FIGS. 10 and 11 illustrate exemplary methods of beam failure recovery in a wireless communications system according to aspects of the disclosure.

FIG. 10 illustrates an exemplary method 1000 of beam failure recovery in a wireless communications system, such as wireless communications system 100, according to aspects of the disclosure. The method 1000 may be performed by a UE, such as any of the UEs described herein.

At 1010, the UE detects a beam failure of a first downlink beam received at the UE from a base station (e.g., any of the base stations described herein), as at 705 and 725 of FIGS. 7A and 7B, respectively. In an aspect, the first downlink beam is a primary downlink beam for a first cell (e.g., PCell, SCell) supported by the base station. In an aspect, operation 1010 may be performed by receiver(s) 354a, RX processor 356, controller/processor 359, and/or memory 360, any or all of which may be considered "means for" performing operation 1010.

At 1020, the UE sends, to the base station, on a SUL beam, a message including an indication of the beam failure and an identification of a second downlink beam to replace the first downlink beam as the primary downlink beam for the first cell, as at 710 and 730 of FIGS. 7A and 7B, respectively. In an aspect, operation 1020 may be performed by transmitter(s) 354b, TX processor 368, controller/processor 359, and/or memory 360, any or all of which may be considered "means for" performing operation 1020.

At 1030, based on the base station configuring the second downlink beam as the primary downlink beam for the first cell, the UE establishes an uplink beam for the first cell based on properties of the second downlink beam, as at 720 and 750 of FIGS. 7A and 7B, respectively. In an aspect, operation 1030 may be performed by transmitter(s) 354b, TX processor 368, controller/processor 359, and/or memory 360, any or all of which may be considered "means for" performing operation 1030.

Figure 11:
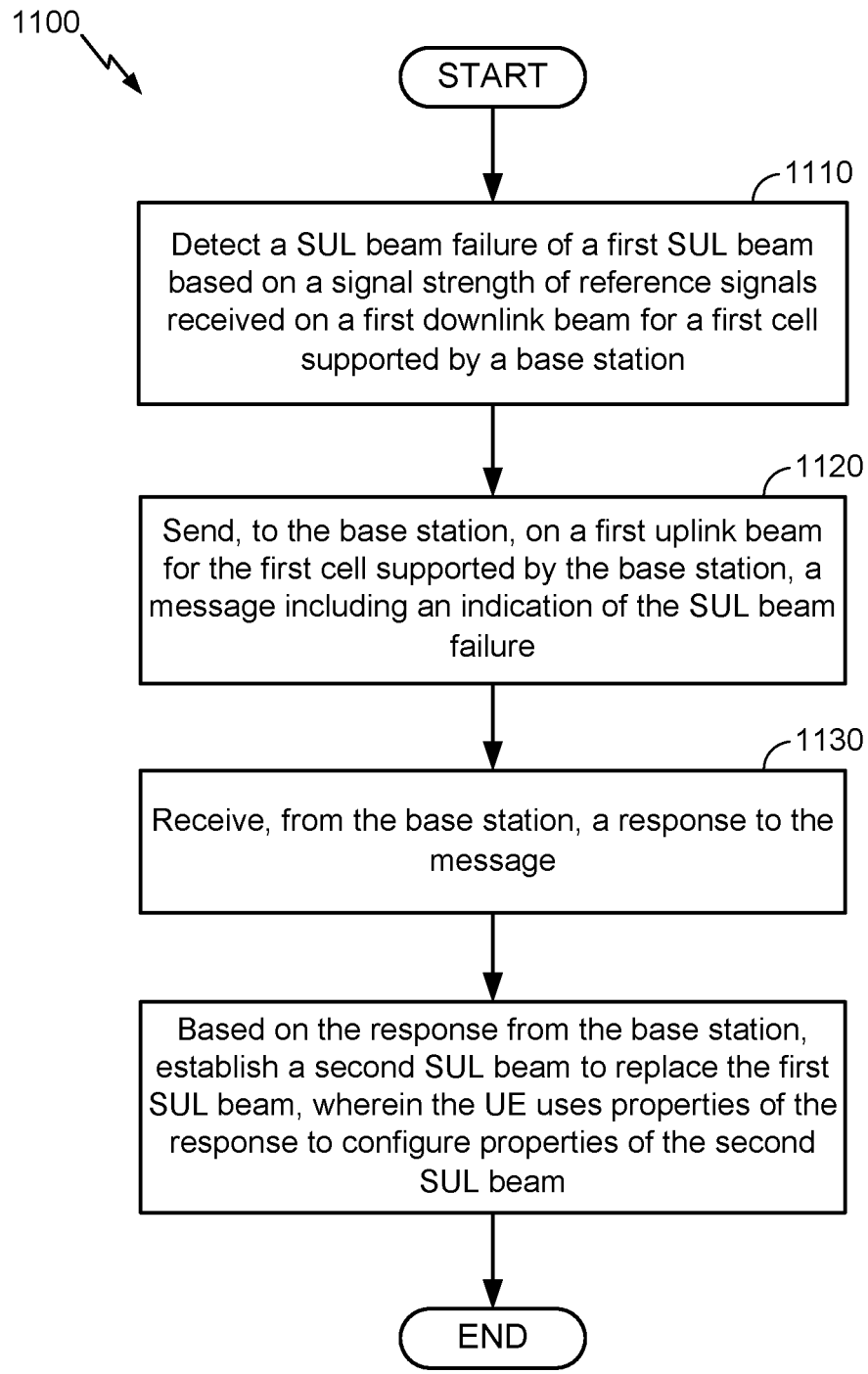

FIG. 11 illustrates an exemplary method 1100 of beam failure recovery in a wireless communications system, such as wireless communications system 100, according to aspects of the disclosure. The method 1100 may be performed by a UE, such as any of the UEs described herein.

At 1110, the UE detects a SUL beam failure of a first SUL beam, as at 805 and 905 of FIGS. 8 and 9, respectively. In an aspect, operation 1110 may be performed by receiver(s) 354a, RX processor 356, controller/processor 359, and/or memory 360, any or all of which may be considered "means for" performing operation 1110.

At 1120, the UE sends, to a base station (e.g., any of the base stations described herein), on a first uplink beam for a first cell (e.g., PCell, SCell) supported by the base station, a message including an indication of the SUL beam failure, as at 810 and 910 of FIGS. 8 and 9, respectively. In an aspect, operation 1120 may be performed by transmitter(s) 354b, TX processor 368, controller/processor 359, and/or memory 360, any or all of which may be considered "means for" performing operation 1120.

At 1130, the UE receives, from the base station, a response to the message, as at 815 and 935 of FIGS. 8 and 9, respectively. In an aspect, operation 1130 may be performed by receiver(s) 354a, RX processor 356, controller/processor 359, and/or memory 360, any or all of which may be considered "means for" performing operation 1130.

At 1140, based on the response from the base station, the UE establishes a second SUL beam to replace the first SUL beam, as at 820 and 940 of FIGS. 8 and 9, respectively. In an aspect, the UE uses properties of the response to configure properties of the second SUL beam. In an aspect, operation 1020 may be performed by transmitter(s) 354b, TX processor 368, controller/processor 359, and/or memory 360, any or all of which may be considered "means for" performing operation 1010.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a compact disk ROM (CD-ROM), or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for beam failure recovery in a wireless communications system.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of beam failure recovery in a wireless communications system performed by a user equipment (UE), comprising:
   detecting a beam failure of a first downlink beam received at the UE from a base station, wherein the first downlink beam is a primary downlink beam for a first cell supported by the base station;
   sending, to the base station, on a supplementary uplink (SUL) beam, a message including an indication of the beam failure and an identification of a second downlink beam to replace the first downlink beam as the primary downlink beam for the first cell; and
   establishing, based on the base station configuring the second downlink beam as the primary downlink beam for the first cell, an uplink beam for the first cell based on properties of the second downlink beam.

2. The method of claim 1, further comprising:
   receiving, from the base station, a control resource set (CORESET) transmission configuration indicator (TCI) state activation signal on the second downlink beam, the CORESET TCI state activation signal indicating resources that have been activated by the base station for the second downlink beam, and wherein the UE establishes the uplink beam based on the CORESET TCI state activation signal.

3. The method of claim 1, further comprising:
   sending, to the base station, on the uplink beam, an uplink signal identifying the second downlink beam; and
   receiving, from the base station on the second downlink beam, in response to sending the uplink signal, a physical downlink control channel (PDCCH) addressed to a cell-radio network temporary identifier (C-RNTI), wherein the UE establishes the uplink beam based on the PDCCH addressed to the C-RNTI.

4. The method of claim 3, wherein the uplink signal comprises a random access channel (RACH) request.

5. The method of claim 1, wherein the first cell comprises a primary cell (PCell) supported by the base station.

6. The method of claim 1, wherein the first cell comprises a secondary cell (SCell) supported by the base station.

7. The method of claim 6, wherein the SUL beam is associated with the SCell supported by the base station.

8. The method of claim 1, wherein the first and second downlink beams are received on a first frequency band and the SUL beam is transmitted on a second frequency band lower than the first frequency band.

9. The method of claim 8, wherein the UE is configured to transmit on either a first uplink beam or the SUL beam, and wherein the first uplink beam is transmitted on the first frequency band.

10. The method of claim 8, wherein the first and second frequency bands are millimeter wave (mmW) frequency bands.

11. A method of beam failure recovery in a wireless communications system performed by a user equipment (UE), comprising:
    detecting a supplementary uplink (SUL) beam failure of a first SUL beam based on a signal strength of reference signals received on a first downlink beam for a first cell supported by a base station;
    sending, to the base station, on a first uplink beam for the first cell supported by the base station, a message including an indication of the SUL beam failure;
    receiving, from the base station, a response to the message; and
    establishing, based on the response from the base station, a second SUL beam to replace the first SUL beam, wherein the UE uses properties of the response to configure properties of the second SUL beam.

12. The method of claim 11, further comprising:
    performing a beam pairing operation based on the response from the base station to establish the second SUL beam.

13. The method of claim 11, wherein the response comprises a physical downlink control channel (PDCCH) addressed to a cell-radio network temporary identifier (C-RNTI), and wherein the UE establishes the second SUL beam based on properties of the PDCCH addressed to the C-RNTI.

14. The method of claim 13, further comprising:
    sending, to the base station, a random access channel (RACH) request on the first SUL beam, wherein the response is received in response to the RACH request.

15. The method of claim 13, wherein the response identifies a type of beam failure recovery for which resources have been reserved.

16. The method of claim 15, wherein the type of beam failure recovery is indicated by an identification of a different CORESET for each of a primary cell (PCell) recovery, a secondary cell (SCell) recovery, and a SUL beam.

17. The method of claim 15, wherein the type of beam failure recovery is indicated by an identification of the same CORESET scrambled with a different RNTI for each of a PCell recovery, a SCell recovery, and a SUL beam.

18. The method of claim 15, wherein the type of beam failure recovery is indicated by the same CORESET, the same downlink control information (DCI), and different additional bits to distinguish each of a PCell recovery, a SCell recovery, and a SUL beam.

19. The method of claim 11, further comprising:
receiving, from the base station, a request for a beam index report;
measuring, in response to receiving the request for the beam index report, downlink reference signals received on one or more downlink beams for the first cell; and
sending, to the base station, the beam index report, the beam index report including measurements of the downlink reference signals received on the one or more downlink beams for the first cell.

20. The method of claim 19, wherein the base station triggers on-demand RACH for SUL recovery in response to reception of the beam index report.

21. The method of claim 11, wherein the first cell comprises a primary cell (PCell) supported by the base station.

22. The method of claim 21, wherein the SUL beam is associated with the PCell supported by the base station.

23. The method of claim 11, wherein the first cell comprises a secondary cell (SCell) supported by the base station.

24. The method of claim 23, wherein the SUL beam is associated with the SCell supported by the base station.

25. The method of claim 11, wherein the first uplink beam is transmitted on a first frequency band, the first downlink beam is received on the first frequency band, and the first and second SUL beams are transmitted on a second frequency band lower than the first frequency band.

26. The method of claim 25, wherein the first and second frequency bands are millimeter wave (mmW) frequency bands.

27. The method of claim 11, wherein the UE detects the SUL beam failure based on the signal strength of the reference signals received on the first downlink beam falling below a threshold.

28. The method of claim 27, wherein the threshold is set such that the signal strength of the reference signals received on the first downlink beam falling below the threshold indicates the SUL beam failure but does not indicate a beam failure of the first downlink beam.

29. An apparatus for beam failure recovery in a wireless communications system, comprising:
at least one processor of a user equipment (UE) configured to:
detect a beam failure of a first downlink beam received at the UE from a base station, wherein the first downlink beam is a primary downlink beam for a first cell supported by the base station;
cause a transceiver of the UE to send, to the base station, on a supplementary uplink (SUL) beam, a message including an indication of the beam failure and an identification of a second downlink beam to replace the first downlink beam as the primary downlink beam for the first cell; and
establish, based on the base station configuring the second downlink beam as the primary downlink beam for the first cell, an uplink beam for the first cell based on properties of the second downlink beam.

30. The apparatus of claim 29, wherein the at least one processor is further configured to:
cause the transceiver to receive, from the base station, a control resource set (CORESET) transmission configuration indicator (TCI) state activation signal on the second downlink beam, the CORESET TCI state activation signal indicating resources that have been activated by the base station for the second downlink beam, and wherein the at least one processor is configured to establish the uplink beam based on the CORESET TCI state activation signal.

31. The apparatus of claim 29, wherein the at least one processor is further configured to:
cause the transceiver to send, to the base station, on the uplink beam, an uplink signal identifying the second downlink beam; and
cause the transceiver to receive, from the base station on the second downlink beam, in response to sending the uplink signal, a physical downlink control channel (PDCCH) addressed to a cell-radio network temporary identifier (C-RNTI), wherein the at least one processor is configured to establish the uplink beam based on the PDCCH addressed to the C-RNTI.

32. The apparatus of claim 31, wherein the uplink signal comprises a random access channel (RACH) request.

33. The apparatus of claim 29, wherein the first cell comprises a primary cell (PCell) supported by the base station.

34. The apparatus of claim 29, wherein the first cell comprises a secondary cell (SCell) supported by the base station.

35. The apparatus of claim 34, wherein the SUL beam is associated with the SCell supported by the base station.

36. The apparatus of claim 29, wherein the first and second downlink beams are received on a first frequency band and the SUL beam is transmitted on a second frequency band lower than the first frequency band.

37. The apparatus of claim 36, wherein the at least one processor is configured to configure the transceiver to transmit on either a first uplink beam or the SUL beam, and wherein the first uplink beam is transmitted on the first frequency band.

38. The apparatus of claim 36, wherein the first and second frequency bands are millimeter wave (mmW) frequency bands.

39. The apparatus of claim 29, wherein the at least one processor comprises a receive processor and a transmit processor of the UE.

40. An apparatus for beam failure recovery in a wireless communications system, comprising:
at least one processor of a user equipment (UE) configured to:
detect a supplementary uplink (SUL) beam failure of a first SUL beam;
cause a transceiver of the UE to send, to a base station, on a first uplink beam for a first cell supported by the base station, a message including an indication of the SUL beam failure;
cause the transceiver to receive, from the base station, a response to the message; and establish, based on the response from the base station, a second SUL beam to replace the first SUL beam, wherein the at least one processor is configured to use properties of the response to configure properties of the second SUL beam.

41. The apparatus of claim 40, wherein the at least one processor is further configured to perform a beam pairing operation based on the response from the base station to establish the second SUL beam.

42. The apparatus of claim 40, wherein the response comprises a physical downlink control channel (PDCCH) addressed to a cell-radio network temporary identifier (C-RNTI), and wherein the at least one processor is configured to establish the second SUL beam based on properties of the PDCCH addressed to the C-RNTI.

43. The apparatus of claim 42, wherein the at least one processor is further configured to:
cause the transceiver to send, to the base station, a random access channel (RACH) request on the first SUL beam, wherein the response is received in response to the RACH request.

44. The apparatus of claim 42, wherein the response identifies a type of beam failure recovery for which resources have been reserved.

45. The apparatus of claim 44, wherein the type of beam failure recovery is indicated by an identification of a different CORESET for each of a primary cell (PCell) recovery, a secondary cell (SCell) recovery, and a SUL beam.

46. The apparatus of claim 44, wherein the type of beam failure recovery is indicated by an identification of the same CORESET scrambled with a different RNTI for each of a PCell recovery, a SCell recovery, and a SUL beam.

47. The apparatus of claim 44, wherein the type of beam failure recovery is indicated by the same CORESET, the same downlink control information (DCI), and different additional bits to distinguish each of a PCell recovery, a SCell recovery, and a SUL beam.

48. The apparatus of claim 40, wherein the at least one processor is further configured to:
cause the transceiver to receive, from the base station, a request for a beam index report;
measure, in response to receiving the request for the beam index report, downlink reference signals received on one or more downlink beams for the first cell; and
cause the transceiver to send, to the base station, the beam index report, the beam index report including measurements of the downlink reference signals received on the one or more downlink beams for the first cell.

49. The apparatus of claim 48, wherein the base station triggers on-demand RACH for SUL recovery in response to reception of the beam index report.

50. The apparatus of claim 40, wherein the first cell comprises a primary cell (PCell) supported by the base station.

51. The apparatus of claim 50, wherein the SUL beam is associated with the PCell supported by the base station.

52. The apparatus of claim 40, wherein the first cell comprises a secondary cell (SCell) supported by the base station.

53. The apparatus of claim 52, wherein the SUL beam is associated with the SCell supported by the base station.

54. The apparatus of claim 40, wherein the first uplink beam is transmitted on a first frequency band, the first downlink beam is received on the first frequency band, and the first and second SUL beams are transmitted on a second frequency band lower than the first frequency band.

55. The apparatus of claim 54, wherein the first and second frequency bands are millimeter wave (mmW) frequency bands.

56. The apparatus of claim 40, wherein the at least one processor is further configured to detect the SUL beam failure based on the signal strength of the reference signals received on the first downlink beam falling below a threshold.

57. The apparatus of claim 56, wherein the threshold is set such that the signal strength of the reference signals received on the first downlink beam falling below the threshold indicates the SUL beam failure but does not indicate a beam failure of the first downlink beam.

58. The apparatus of claim 40, wherein the at least one processor comprises a receive processor and a transmit processor of the UE.

59. An apparatus for beam failure recovery in a wireless communications system, comprising:
means for detecting a beam failure of a first downlink beam received at a user equipment (UE) from a base station, wherein the first downlink beam is a primary downlink beam for a first cell supported by the base station;
means for sending, to the base station, on a supplementary uplink (SUL) beam, a message including an indication of the beam failure and an identification of a second downlink beam to replace the first downlink beam as the primary downlink beam for the first cell; and
means for establishing, based on the base station configuring the second downlink beam as the primary downlink beam for the first cell, an uplink beam for the first cell based on properties of the second downlink beam.

60. An apparatus for beam failure recovery in a wireless communications system, comprising:
means for detecting a supplementary uplink (SUL) beam failure of a first SUL beam based on a signal strength of reference signals received on a first downlink beam for a first cell supported by a base station;
means for sending, to the base station, on a first uplink beam for the first cell supported by the base station, a message including an indication of the SUL beam failure;
means for receiving, from the base station, a response to the message; and
means for establishing, based on the response from the base station, a second SUL beam to replace the first SUL beam, wherein properties of the response are used to configure properties of the second SUL beam.

61. A non-transitory computer-readable medium storing computer-executable instructions, the computer-executable instructions comprising:
at least one instruction instructing a user equipment (UE) to detect a beam failure of a first downlink beam received at the UE from a base station, wherein the first downlink beam is a primary downlink beam for a first cell supported by the base station;
at least one instruction instructing the UE to send, to the base station, on a supplementary uplink (SUL) beam, a message including an indication of the beam failure and an identification of a second downlink beam to replace the first downlink beam as the primary downlink beam for the first cell; and
at least one instruction instructing the UE to establish, based on the base station configuring the second downlink beam as the primary downlink beam for the first cell, an uplink beam for the first cell based on properties of the second downlink beam.

62. A non-transitory computer-readable medium storing computer-executable instructions, the computer-executable instructions comprising:
- at least one instruction instructing a user equipment (UE) to detect a supplementary uplink (SUL) beam failure of a first SUL beam;
- at least one instruction instructing the UE to send, to a base station, on a first uplink beam for a first cell supported by the base station, a message including an indication of the SUL beam failure;
- at least one instruction instructing the UE to receive, from the base station, a response to the message; and
- at least one instruction instructing the UE to establish, based on the response from the base station, a second SUL beam to replace the first SUL beam, wherein the UE is configured to use properties of the response to configure properties of the second SUL beam.

* * * * *